US011206512B2

(12) United States Patent
Smith

(10) Patent No.: US 11,206,512 B2
(45) Date of Patent: *Dec. 21, 2021

(54) SYSTEMS AND METHODS FOR BROADCASTING DIGITAL DATA TO A PLURALITY OF RECEIVERS

(71) Applicant: CEWI NETWORKS, INC., Flowery Branch, GA (US)

(72) Inventor: Colin York Smith, Flowery Branch, GA (US)

(73) Assignee: CeWi Networks, Inc., Flowery Branch, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/007,287

(22) Filed: Aug. 31, 2020

(65) Prior Publication Data

US 2020/0404457 A1    Dec. 24, 2020

Related U.S. Application Data

(63) Continuation of application No. 16/286,186, filed on Feb. 26, 2019.

(60) Provisional application No. 62/792,003, filed on Jan. 14, 2019, provisional application No. 62/635,104, filed on Feb. 26, 2018.

(51) Int. Cl.
| | |
|---|---|
| H04W 4/06 | (2009.01) |
| G06F 16/41 | (2019.01) |
| H04L 29/06 | (2006.01) |
| H04W 4/021 | (2018.01) |

(52) U.S. Cl.
CPC ............ *H04W 4/06* (2013.01); *G06F 16/41* (2019.01); *H04L 65/60* (2013.01); *H04L 69/16* (2013.01); *H04W 4/021* (2013.01)

(58) Field of Classification Search
CPC ........ H04W 4/06; H04W 4/021; H04L 65/60; H04L 69/16; G06F 16/41
See application file for complete search history.

(56) References Cited

U.S. PATENT DOCUMENTS

2005/0013417 A1*  1/2005  Zimmers ............... H04L 51/066
                                                                       379/37
2009/0134982 A1*  5/2009  Robertson .............. H04H 20/59
                                                                       340/326

* cited by examiner

*Primary Examiner* — Melvin C Marcelo
(74) *Attorney, Agent, or Firm* — Rimon PC; Marc Kaufman

(57) ABSTRACT

This invention relates to the wireless broadcast of digital multimedia information to a plurality of receivers, especially in environments where bi-directional communications are not possible or practical.

11 Claims, 16 Drawing Sheets

| ID | ALIAS | TEAM | ID | GAME STATUS | ID | ID | SCREEN COLOR | ID,ALIAS, |
|---|---|---|---|---|---|---|---|---|
| 0 | BLANK | "" | 1 | PRE-GAME | 1 | 0 | TRANSPARENT | 0,MVXCOLORS.TRANSPARENT, |
| 1 | ABCHR | ABILENE CHRISTIAN 2 | 2 | IN-PROGRESS | 2 | 1 | ALICEBLUE | 1,MVXCOLORS.ALICEBLUE, |
| 2 | AF | AIRFORCE 4 | 4 | FINAL | 3 | 2 | ANTIQUEWHITE | 2,MVXCOLORS.ANTIQUEWHITE, |
| 3 | AKRON | AKRON 5 | 5 | POSTPONED | 4 | 3 | AQUA | 3,MVXCOLORS.AQUA, |
| 4 | ALA | ALABAMA 6 | 6 | SUSPENDED | 5 | 4 | AQUAMARINE | 4,MVXCOLORS.AQUAMARINE, |
| 5 | ALA A&M | ALABAMA A&M 7 | 7 | FORFEIT BY AWAY | 6 | 5 | AZURE | 5,MVXCOLORS.AZURE, |
| 6 | ALBANY | ALBANY 8 | 8 | FORFEIT BY HOME | ... | 6 | BEIGE | 6,MVXCOLORS.BEIGE, |
| 7 | ALC | ALCORN STATE 10 | 10 | FORFEIT BY BOTH TEAMS | | 7 | BISQUE | 7,MVXCOLORS.BISQUE, |
| 8 | ALST | ALABAMA STATE 11 | 11 | FORFEIT BY AWAY TEAM - CONFERENCE ONLY | | 8 | BLACK | 8,MVXCOLORS.BLACK, |
| 9 | APP | APPALACHIAN STATE 12 | 12 | FORFEIT BY HOME TEAM - CONFERENCE ONLY | | 9 | BLANCHEDALMOND | 9,MVXCOLORS.BLANCHEDALMOND, |
| 10 | APSU | AUSTIN PEAY 23 | 23 | DELAYED | | 10 | BLUE | 10,MVXCOLORS.BLUE, |
| 11 | ARI | ARIZONA | | | | 11 | BLUEVIOLET | 11,MVXCOLORS.BLUEVIOLET, |
| 12 | ARIST | ARIZONA STATE | | | | 12 | BROWN | 12,MVXCOLORS.BROWN, |
| 13 | ARK | ARKANSAS | | | | 13 | BURLYWOOD | 13,MVXCOLORS.BURLYWOOD, |
| 14 | ARK-PB | ARKANSAS-PINEBLUFF | | | | 14 | CADETBLUE | 14,MVXCOLORS.CADETBLUE, |
| 15 | ARKST | ARKANSAS STATE | | | | 15 | CHARTREUSE | 15,MVXCOLORS.CHARTREUSE, |
| 16 | ARMY | ARMY | | | | 16 | CHOCOLATE | 16,MVXCOLORS.CHOCOLATE, |
| 17 | AUBURN | AUBURN | | | | 17 | CORAL | 17,MVXCOLORS.CORAL, |
| 18 | BALLST | BALLSTATE | | | | 18 | CORNFLOWERBLUE | 18,MVXCOLORS.CORNFLOWERBLUE, |
| 19 | BAYLOR | BAYLOR | | | | 19 | CORNSILK | 19,MVXCOLORS.CORNSILK, |
| 20 | BC | BOSTON COLLEGE | | | | 20 | CRIMSON | 20,MVXCOLORS.CRIMSON, |
| 21 | B-C | BETHUNE-COOKMAN | | | | 21 | CYAN | 21,MVXCOLORS.CYAN, |
| 22 | BGSU | BOWLING GREEN | | | | 22 | DARKBLUE | 22,MVXCOLORS.DARKBLUE, |
| 23 | BOISE | BOISE STATE | | | | 23 | DARKCYAN | 23,MVXCOLORS.DARKCYAN, |
| 24 | BROWN | BROWN | | | | 24 | DARKGOLDENROD | 24,MVXCOLORS.DARKGOLDENROD, |
| 25 | BRYANT | BRYANT | | | | 25 | DARKGRAY | 25,MVXCOLORS.DARKGRAY, |
| 26 | BUCK | BUCKNELL | | | | 26 | DARKGREEN | 26,MVXCOLORS.DARKGREEN, |
| 27 | BUFF | BUFFALO | | | | 27 | DARKKHAKI | 27,MVXCOLORS.DARKKHAKI, |
| 28 | BUTLER | BUTLER | | | | 28 | DARKMAGENTA | 28,MVXCOLORS.DARKMAGENTA, |
| 29 | BYU | BRIGHAM YOUNG | | | | 29 | DARKOLIVEGREEN | 29,MVXCOLORS.DARKOLIVEGREEN, |
| 30 | CAL | CALIFORNIA | | | | 30 | DARKORANGE | 30,MVXCOLORS.DARKORANGE, |
| 31 | CALPLY | CALPOLY | | | | ... | ... | |
| 32 | CAMP | CAMPBELL | | | | | | |
| 33 | CENARK | CENTRAL ARKANSAS | | | | | | |
| 34 | CENTCT | CENTRAL CONNECTICUT STATE | | | | | | |
| 35 | CENTMI | CENTRAL MICHIGAN | | | | | | |
| 36 | CHAR | CHARLOTTE | | | | | | |
| 37 | CHAT | CHATTANOOGA | | | | | | |
| 38 | CHSOU | CHARLESTON SOUTHERN | | | | | | |
| 39 | CIN | CINCINNATI | | | | | | |
| 40 | CIT | CITADEL | | | | | | |
| 41 | CLEM | CLEMSON | | | | | | |
| 42 | COASTC | COASTAL CAROLINA | | | | | | |
| 43 | COLG | COLGATE | | | | | | |
| 44 | COLO | COLORADO | | | | | | |
| 45 | COLOST | COLORADO STATE | | | | | | |

| Byte# | Identifier | Value |
|---|---|---|
| 0 | MID | 0xF4 (Variable Length Message) |
| 1 | VID | 0 to 255 (Event Specific) |
| 2 | PID | Location of Data in Cell ($C_L$) |
| 3 | LEN | Message Length ($P_L$+8, 125 max) |
| 4 | AT | 0 to 255 (Table Number) |
| 5 | AR | 0 to 255 (Row Number) |
| 6 | AC | 0 to 255 (Column Number) |
| 7 | D0 | Data Byte 0 |
| 8 | D1 | Data Byte 1 |
| 9 | D2 | Data Byte 2 |
| 10 | D3 | Data Byte 3 |
| ...... | .... | ............ |
| $P_L$ +7 | $D(P_L)$ | Data Byte n |
| Checksum | CHK | [Sum(#0 - $D(P_L)$) And 0xFF] XOR 0xFF |

FIG. 6A

Example Message Structure

| MID | VID | PID | LEN | AT | AR | AC | D0 | D1 | CHK |
|---|---|---|---|---|---|---|---|---|---|
| 0xF4 | 0x30 | 0x11 | 0x09 | 0x11 | 0x01 | 0x01 | 0x01 | 0x00 | 0xAD |

MID = F4 = Variable Length Message
VID = 48
PID = 17
LEN = 9
AT = Table # = 17
AR = Row# = 1
AC = Column# = 1
Data = D0+D1 = 01, 00
CHK = AD

FIG. 6B

ALERT MESSAGE
(XML)

```
<?xml version="1.0" encoding="UTF-8"?>
<alert xmlns ="urn:oasis:names:tc:emergency:cap:1.2 ">
<identifier>43b080713727</identifier>
<sender>hsas@dhs.gov</sender>
<sent>2003-04-02T14:39:01-05.00</sent>
<status> Actual </stats>
<msgType> Alert </msgType>
<scope> Public </scope>
<info>
<category> Security </category>
<event> Homeland Security Advisory System Update </event>
<urgency> Immediate </urgency>
<severity> Severe </severity>
<certainty> Likely </certainty>
<sender Name> U.S.Government, Department of Homeland Security</sender Name>
<headline> Homeland Security Sets Code ORANGE</headline>
<description> The Department of Homeland Security has elevated the Homeland Security Advisory System threat level to ORANGE/High In response to Intelligence which may indicate a heightened threat of terrorism</description>
<Instruction> A High Condition is declared when there is a high risk of terrorist attacks. In addition to the Protective Measures taken in the previous Threat Conditions, Federal departments and agencies should consider agency-specific Protective Measures in accordance with their existing plans</Instruction>
<web> http://www.dhs.gov/dhspublic/display?theme=29</web>
<parameter>
<value Name> HSAS </value Name>
<value> ORANGE </value>
<parameter>
<resource>
<resource Desc> Image file(GIF)</resource Desc>
<mime Type> Image/gif </mime Type>
<Url>http://www.dhs.gov/dhspublic/get AdvisoryImage</Url>
</resource>
<area>
<area Desc> U.S. nationwide and interests worldwide</areaDesc>
</area>
</info>
/alert
```

Alert = MID

Identifier = VID

Red Items = Row

Green Items = Cells

Blue Items = New Table

FIG. 9A

Table 0

| Element | Row Number | 0 |
|---|---|---|
| Sender | 0 | hsas@dhs.gov |
| Sent | 1 | 2003-04-02T14:39:01-05:00 |
| Status | 2 | Actual |
| Msg Type | 3 | Alert |
| Scope | 4 | Public |

Table 1

| Element | Row Number | 0 | 1 |
|---|---|---|---|
| Category | 0 | Security | |
| Event | 1 | Homeland Security Advisory Update | |
| Urgency | 2 | Immediate | |
| Severity | 3 | Severe | |
| Certainty | 4 | Likely | |
| Sender Name | 5 | U.S. Government Department of Homeland Security | |
| Headline | 6 | Homeland Security Sets Code ORANGE | |
| Description | 7 | The Department of Homeland ... | |
| Instruction | 8 | A High Condition is declared .... | |
| Web | 9 | http://www.dhs.gov/dhspublic/display?theme=29 | |
| Parameter | 10 | HSAS | ORANGE |
| Resource | 11 | Image File/GIF | Table 2 |
| Area | 12 | U.S. nationwide and interests worldwide | |

Sample Message

| 0xD7 | 0x3A | 0x0 | 0x0E | 0x0 | 0x02 | 0x0 | "A" | "C" | "T" | "U" | "A" | "L" | 0xAC |
|---|---|---|---|---|---|---|---|---|---|---|---|---|---|

FIG. 9B

SYSTEMS AND METHODS FOR BROADCASTING DIGITAL DATA TO A PLURALITY OF RECEIVERS

CROSS-REFERENCE TO RELATED APPLICATIONS

This application is continuation of U.S. Ser. No. 16/286,186 filed on Aug. 29, 2019, which claims priority from and incorporates by reference in their entireties U.S. Provisional Patent Application Ser. No. 62/635,104 for "Methodology Developed for the Transfer of Digital Information by Broadcasting to an Unlimited Number of Receivers" filed Feb. 26, 2018, and 62/792,003, for "System and Method for Broadcasting Digital Data to Receivers," filed Jan. 14, 2019.

FIELD OF THE INVENTION

This invention relates to the wireless broadcast of digital information to a plurality of receivers, especially in environments where bi-directional communications are not possible or practical.

BACKGROUND OF THE INVENTION

In environments where large groups of people congregate, such as at sporting events, rallies, speeches, concerts, etc., access to digital data using mobile phones and wireless devices is unreliable.

In such instances, high numbers of mobile devices compete for the attention of a cellular network's nearby antennas. Although a mobile device user may see bars on the device's screen showing there is a signal available, data is not being received and returned from the cellular network consistently. Such networks may be further strained by "high traffic" because such events are frequently occasions when recipients 120 are apt to use data-heavy applications and multimedia such as voice, photo, media and video sharing that consume large amounts of network bandwidth.

Analogous network overload occurs in emergency situations or during disasters. Following the Boston Marathon bombing, for example, mobile phone carriers were swamped with traffic as thousands of people attempted to reach loved ones in the Boston area. In the aftermath of natural disasters, terrorist attacks, and other such incidents worldwide, telecommunications networks simply are not able cope with a sharp increase in voice call volume or data traffic (e.g., text/SMS and multimedia messages). Recipients 120 of every major mobile carrier reported outages in the Boston metropolitan area during the event. This lead to the spreading of unconfirmed rumors that were taken as facts by the media, such as the Associated Press incorrectly reporting that mobile service had been shut off in Boston to prevent remote detonation of bombs with mobile phone times.

Natural disasters may also cause cellular networks to be unreliable. Shortly after hurricane Sandy, for example, the FCC warned that mobile service was devastated by the storm (https://www.fastcompany.com/3002578/post-sandy-fcc-warns-worsening-cell-phone-networks). Although Sandy involved a physical destruction of mobile network infrastructure that was very different from high network volume, the basic elements are the same.

When disaster strikes, the decentralized nature of the network means that entire geographic regions can be compromised by increased network usage, particularly from recipients 120 seeking real-time information from central (e.g., news, governmental) sources in the areas related to an event. When bandwidth at carrier site is strained, recipients 120 are prevented from making calls and communicating digital, and in particular, multimedia data.

Similarly, in poor connectivity environments, communication between mobile devices and mobile or other networks may be unreliable, particularly when combined with "high density" locations such as construction sites, healthcare facilities, shopping malls, convention centers, etc.

Despite these challenges, recipients 120 expect to remain connected via their mobile devices anytime and anywhere. Cellular and networking companies have deployed a mix of strategies to increase reliability under such circumstances. For example, current cellular technologies will allow an approximate maximum of 2,000 simultaneous connections per cell tower or distributed antenna system (DAS) sector. At a large event like a stadium football game, in order to reach 50,000 fans simultaneously, 25 cell phone towers would be required. Some networks have added or upgraded antennas in or near large-capacity venues and in the cell towers nearby, and some have installed "small cells" to improve capacity inside large-crowd venues like sports stadiums. Small cells have a smaller range than regular cell towers, but they can supplement those towers to boost capacity in dense areas. Networks also deploy temporary cell sites to large-capacity venues, sometimes referred to as a "cell on wheels," or cows, to boost network connectivity.

Newer venues are also more likely to have Wi-Fi, which relieves stress on the cellphone network. But historically, Wi-Fi equipment has been installed high up in ceilings or walls. Signals can thus be interrupted by obstructions from steel and other construction materials. And mobile device recipients 120 can be relativity far away from the routers, comprising communication with the network. Wi-Fi capacity also tends to be smaller: current Wi-Fi technology allows less than 200 simultaneous connections per access point (antenna). Access points also typically only have a 100 foot leave.

However, these network improvements have not made network service in crowded areas consistently reliable, particularly with respect to communication of digital data, e.g., photos, videos, and multimedia content. Even with improved infrastructure in place, technical challenges and limitations associated with the proximity of the multiple transmitters, movement of fans, and other complexities make it impossible to reach all of the attendees simultaneously.

Current digital file transfer protocols such as TCPIP, Bluetooth, and other protocols require a bi-directional communication link to function in order to provide a backchannel for digital acknowledgement of proper file reception. The bi-directional nature of the communication between, e.g., a cell tower and a mobile device means that communications or transmissions can be dropped if there is an interruption in communications. There exist certain file transfer protocols that do not require bi-directional feedback, such as UDP, but these protocols still require continuous, uninterrupted reception of an entire file in order to assure uncorrupted data is transmitted and successful received at the receiving end. Accordingly, a need exists for file transfer protocols that permit receipt of uncorrupted digital data even where the signal is not perfectly continuous and uninterrupted.

With respect to emergency situations and natural disasters, Congress has directed the establishment of a process for the creation of a national mobile alerting system, now known as WEA, whereby participating commercial mobile service ("CMS") providers transmit emergency alerts to their subscribers. Since then, there has been a high level of participation by CMS providers, with all four major wireless carriers participating in the system, which accounts for 98.6% of the U.S. population being served. Yet despite most areas of the country now being covered, there is continued concern about the content, presentation and geographic targeting of the WEA Messages.

In recent years, the Commission has expended considerable time and effort on the question of improving the content and method of delivery of WEA Messages. For example, capabilities of WEA Messages have been enhanced in 2016 by increasing the character length of messages to 360 characters. This improves the quality of information available to the public during emergencies and reduce public confusion caused by difficult-to-understand abbreviations. But there is still a need for improvement in the quality of WEA Alert messaging, particularly with respect to multimedia, which can not only improve the content of the information provided, but also assist in further identifying the actual nature and location of emergency situations (such as by providing maps in alerts). The recent confusion caused by a false WEA Alert Message regarding a supposed missile attack on Hawaii has increased this push to improve messaging through inclusion of multimedia. Similarly, in the case of the recent California fires in the Santa Barbara area, residents and first responders could have benefited from multimedia such as maps that would have more clearly delineated the areas affected by evacuation orders.

CMS carriers and others in the telecommunications industry assert that insertion of multimedia in WEA Alerts is not yet feasible. The industry's standards organization. Alliance for Telecommunications Industry Solutions ("ATIS") maintains that "[c]ell broadcast technology is not designed for multimedia" and "numerous issues that would make the presentation of multimedia content in WEA notifications problematic if not technically infeasible." (Comments of The Alliance for Telecommunications Industry Solutions in PS Docket 15-91, Jan. 13, 2016, at 9.) ATIS further contends that "presentation of multimedia content, such as maps, photos and hazard symbols, in WEA notifications [is] problematic if not technically infeasible[.]" (Id, at 10.)

Improved systems and methods for broadcasting digital data, particularly in emergency situations, or in high-density, poor connectivity environments, is desired.

Additionally, improved systems and methods for broadcasting multimedia, particularly in emergency situations, or in large capacity venues, is desired.

Further, improved systems and methods for broadcasting encrypted messages that are relevant to an event or emergency are desired, and additionally, broadcasting messages to selected receivers is desireable, e.g., certain emergency responders.

Sponsors and marketers are likewise seeking better ways to connect to recipients on mobile devices at large events (e.g., sporting events or concerts) to execute brand activation campaigns.

SUMMARY OF THE INVENTION

The invention comprises, in one form thereof, systems, protocols and methods for broadcasting digital data that that eliminate the need for either a feedback loop, or uninterrupted reception of a data stream, in order to accurately transfer digital, and in some instances, multimedia, information. More particularly, the invention permits the wireless broadcast of digital information to a plurality of receivers in environments where bi-directional communications are not possible or practical.

In another form, the invention disclosed here provides systems, methods, and communications protocols for transmitting a serial data stream that does not require bi-directional feedback.

In yet another form, the invention comprises a system and method for communicating data with a large number of devices in a one to many (1:MANY) configuration using a novel container format or header information. This allows for "pushing" any type of digital information, including, but not limited to, digital files and media, streaming data, and digital functions that can then be used for command and control of digital devices to a plurality of receivers at a particular venue or within a selected radius.

One general aspect includes a system for wirelessly broadcasting multimedia data to a plurality of mobile receivers, including: a central service operable to segment the multimedia data into two or more digital data segments, encapsulate the two or more digital data segments with header information, and communicate the two or more digital data segments to a remote data server for broadcast to the plurality of remote mobile receivers, where the header information includes a venue identifier, at least one octet identifying whether the multimedia data is intended for all of the plurality of mobile receivers at the venue, a data type indicator, a series indicator that indicates whether or not the digital data segment is one of a series, a total octet number indicator that indicates the total number of octets in each of the two or more digital data segments, and/or address location information that indicates a location where each of the two or more digital data segments is to be stored. The header information also includes a checksum. The remote data server is operable to receive the two or more digital data segments, store the two or more digital data segments, and repeatedly transmit the two or more digital data segments to a transmitter for broadcast to the plurality of remote mobile receivers. The system also includes a transmitter operable to broadcast the two or more digital data segments received from the remote data server to the plurality of mobile receivers. The plurality of mobile receivers each includes an antenna and a unique identifier, and is paired to at least one host device, and is operable to receive the two or more digital data segments from the transmitter and re-transmit the two or more digital data segments to the at least one paired host device. Each host device includes a display and is operable to receive the two or more digital data segments, reformat the two or more digital data segments into the multimedia data, and display the multimedia data. Other embodiments of this aspect include corresponding computer systems, apparatus, and computer programs recorded on one or more computer storage devices, each configured to perform the actions of the methods.

Implementations may include one or more of the following features: a return channel to the central service from the at least one paired host device through an alternate communication network not including the transmitter, where said alternate communication network includes a TCP/IP communication channel from at least one of the plurality of mobile receivers to the central service and/or a plurality of short range proximity receivers within range of the at least one of the plurality of mobile receivers. The system further includes a user profile associated with each of the plurality of mobile receivers. The central service may further re-deliver the two or more digital data segments for broadcast to the remote data server for a predetermined period of time.

Implementations of the described techniques may include hardware, a method or process, or computer software on a computer-accessible medium.

Another general aspect includes a method of wirelessly broadcasting multimedia data to a plurality of mobile receivers, including the steps of: at a central service, segmenting multimedia data into at least two digital data segments; encapsulating each of the at least two digital data segments with header information, the header information including at least one octet identifying whether the multimedia data is intended for all of the plurality of mobile receivers at a given location, at least one octet identifying a data location in a cell of a data table or memory map, and at least one octet with data for said cell; repeatedly transmitting the at least two digital data segments to a remote data server for broadcast to a plurality of remote mobile receivers over a predetermined period of time; receiving the at least two digital data segments at the remote data server; storing the at least two digital data segments at the remote data server; communicating the at least two digital data segments via a carousel buffer to a transmitter for broadcast to the plurality of remote mobile receivers; broadcasting the at least two digital data segments to the plurality of mobile receivers; transmitting, by at least one of the plurality of mobile receivers, the at least two digital data segments to a host device paired to the at least one of the plurality of mobile receivers; receiving the at least two digital data segments at the host device; caching the at least two digital data segments; assembling the at least two digital data segments such that the multimedia data is displayable; and displaying the multimedia data on the host device. Other embodiments of this aspect include corresponding computer systems, apparatus, and computer programs recorded on one or more computer storage devices, each configured to perform the actions of the methods.

A further aspect includes a system for wirelessly broadcasting multimedia data to a plurality of mobile receivers, including: a central service operable to segment multimedia data into digital data segments, encapsulate the digital data segments with a first header information, and communicate the digital data segments to a remote data server for broadcast to a plurality of remote mobile receivers. The system also includes a remote service operable to communicate remote service data with a second header information to the remote data server for broadcast with the digital data segments and first header information from the central service to the plurality of remote mobile receivers. The remote data server may be further operable to receive the digital data segments and first header information from the central service, receive remote service data and second header information from the remote service, and store the digital data segments, the first header information, the second header information, and the remote service data. The remote data server may repeatedly transmit via a carousel buffer the digital data segments, the first header information, the second header information, and the remote service data to a transmitter for broadcast to the plurality of mobile receivers. The system also includes a transmitter is operable to broadcast the digital data segments, the first header information, the second header information, and the remote service data to the plurality of mobile receivers. Other embodiments of this aspect include corresponding computer systems, apparatus, and computer programs recorded on one or more computer storage devices, each configured to perform the actions of the methods.

Yet a further general aspect includes a system for wirelessly broadcasting multimedia data to a plurality of mobile receivers, including a central service running a transmitter program operable to segment multimedia data into digital data segments, encapsulate each digital data segment with header information, and communicate each digital data segment with header information to a remote data server for broadcast to a plurality of remote mobile receivers. The header information includes a venue identifier, a digital data segment type indicator, a mobile receiver identifier, a series indicator that indicates whether or not each digital data segment is one of a series, a total octet number indicator that indicates the total number of octets in each digital data segment, address location information that indicates a location where the digital data segment is to be stored, and a checksum; and a data server operable to receive the digital data segments and add them to a carousel buffer for continual broadcast by a transmitter until the digital data segments are changed or removed by the central service. Other embodiments of this aspect include corresponding computer systems, apparatus, and computer programs recorded on one or more computer storage devices, each configured to perform the actions of the methods.

Another general aspect includes a method of processing data for a mobile receiver, the method including: receiving and demodulating a first FM broadcast signal including a first container and first digital data segment, where the first container is between 9 octets and 60 octets, and includes a venue identifier, a digital data segment type indicator, a mobile receiver identifier, a series indicator that indicates the first digital data segment is one of a series, a total octet number indicator that indicates the total number of octets in the first digital data segment, address location information that indicates a location where the first digital data segment is to be stored, and a checksum; and receiving and demodulating a second FM broadcast signal including a second container and a second digital data segment, where the second container is between 9 octets and 60 octets, and includes the venue identifier, the digital data segment type indicator, the mobile receiver identifier, a series indicator that indicates the second digital data segment is the second of the series, a total octet number indicator that indicates the total number of octets in the second digital data segment, second address location information that indicates a location where the second digital data segment is to be stored, and a second checksum. Other embodiments of this aspect include corresponding computer systems, apparatus, and computer programs recorded on one or more computer storage devices, each configured to perform the actions of the methods.

BRIEF DESCRIPTION OF THE DRAWINGS

The invention is disclosed with reference to the accompanying drawings, wherein:

FIG. 5A is an illustrative diagram of an example schema for a display according to one embodiment of the invention;

FIG. 5B is an illustrative diagram of an example reference table (A) according to one embodiment of the invention;

FIG. 5C is another illustrative diagram of an example reference table according to one embodiment of the invention;

FIG. 5D is another illustrative diagram of an example reference table (A) according to one embodiment of the invention;

FIG. 6A is an illustrative diagram of an example message structure schema according to one embodiment of the invention;

FIG. 6B is an illustrative diagram of an example message structure according to one embodiment of the invention;

FIG. 9A is an example emergency alert message as specified in the Common Alert Protocol, Ver. 1.2 standard using extensible markup language (XML);

FIG. 9B is diagram illustrating how the information in the XML message of FIG. 9A could be converted to a table format in accordance with one embodiment of the invention;

Corresponding reference characters indicate corresponding parts throughout the several views. The examples set out herein illustrate several embodiments of the invention but should not be construed as limiting the scope of the invention in any manner.

DETAILED DESCRIPTION

Figure 1:
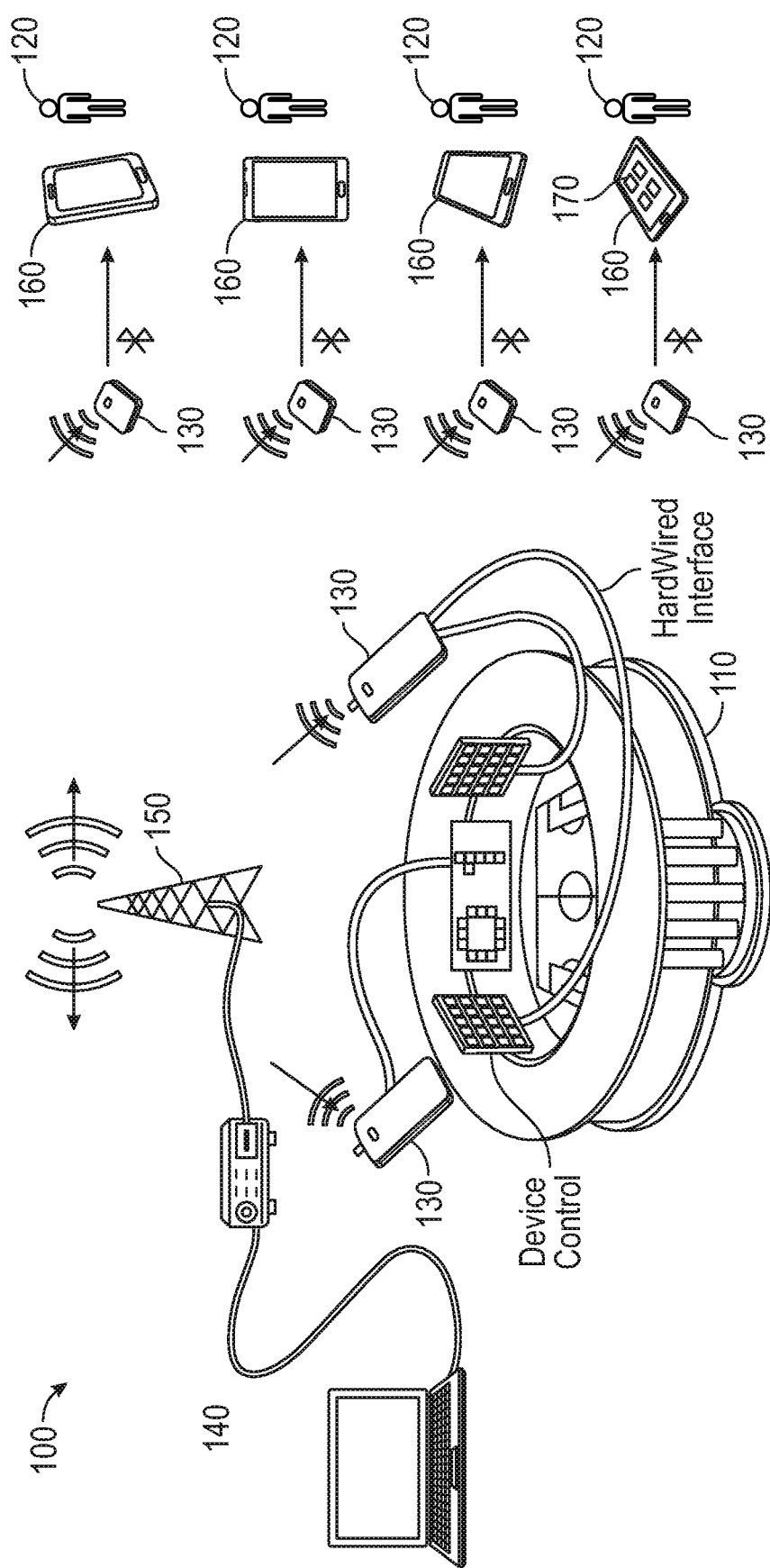
FIG. 1 is a diagram illustrating a portion of a system architecture according to one embodiment of the invention.

Turning now to FIG. 1, a system for communicating data with a large number of devices in a one to many configuration is provided. The system is operable to push any type of digital information, including, but not limited to, digital files, streaming data, multimedia files, and digital functions which can then be used for command and control of digital devices.

FIG. 1 illustrates a system 100 deployed in a venue 110 to communicate digital data to a large groups of recipients 120 each having a mobile receiver 130. The venue 110 is equipped with a data server 140 and a transmitter 150 for broadcasting data wirelessly. Transmitter 150 may be a small (e.g., 4 foot) antenna deployed at venue 110. In one embodiment, transmitter 150 and data server 140 are integrated into the same physical device. Alternatively, transmitter 150 is controlled and/or configured by software operating on a remote computer device. Each mobile receiver 130 can retransmit data to a host device 160, such as a mobile phone, or use the data to command/control other equipment. In one embodiment, mobile receiver 130 and host device 160 are integrated into the same physical device. The host device 160, if used, is operable to run an application 170 that is displayed or otherwise made available on host device 160 data received from the mobile receiver 130, and permits transmission of responses thereto over networks available to host device 160, preferably TCP/IP networks. System 100 may interconnect with other access networks, but for simplicity those entities/interfaces are not shown. As shown, system 100 provides packet-switched services.

Figure 2:
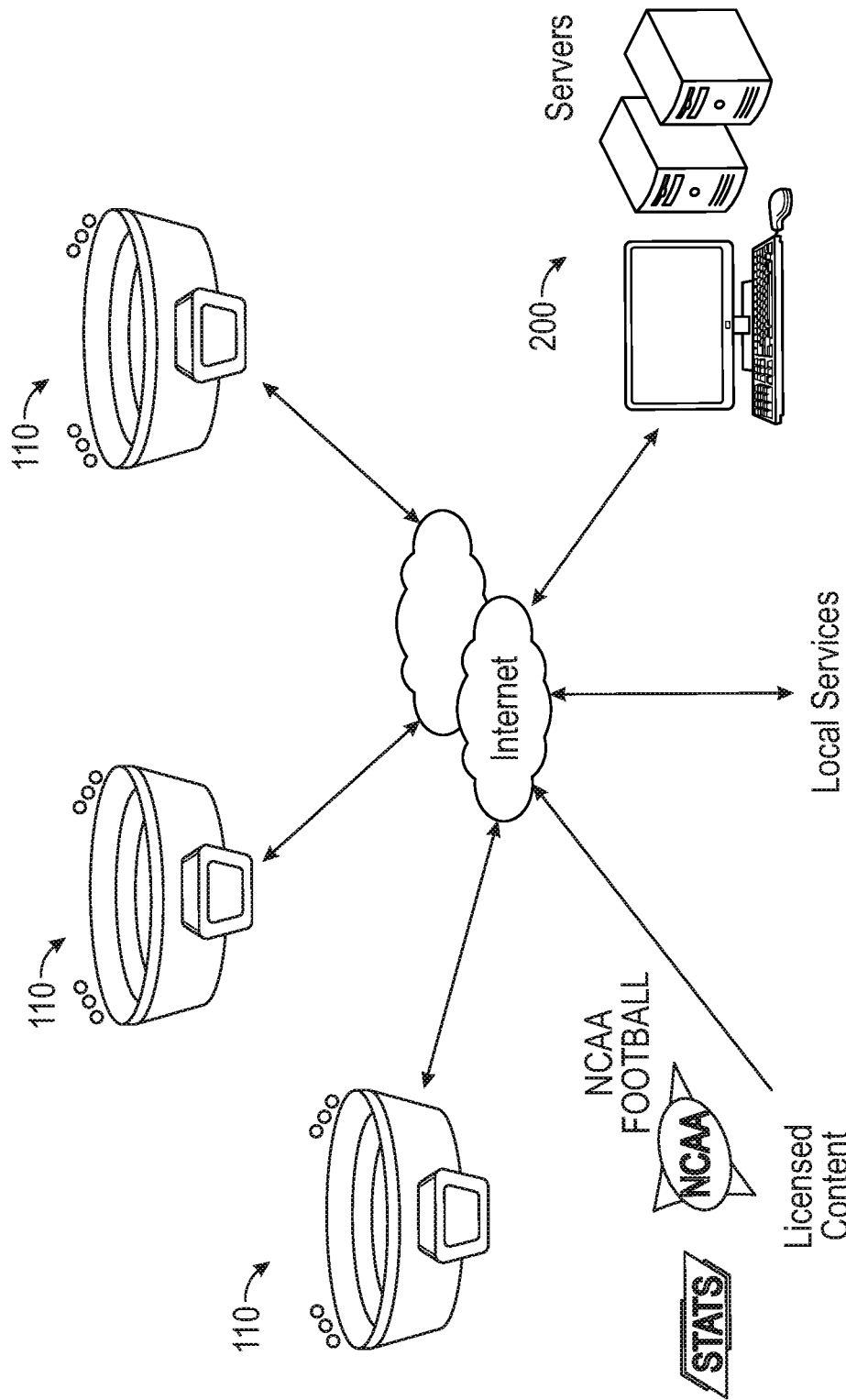
FIG. 2 is a diagram illustrating a portion of a system architecture according to one embodiment of the invention.

In one embodiment, recipients 120 receive encrypted or coded messages intended only for their mobile receiver 130 by registering their mobile receiver 130 with a central service detailed in FIG. 2.

In an embodiment illustrated in FIG. 2, a data feed (which may include data broadcast programming) is provided venue 110 via the internet from a networked central service 200. Central service 200 may include servers, which can be Web servers or streaming servers tailored for the audio/video/text/command streaming application. The files on the servers may contain any type of audio/video text/command content. Central service 200 directs an audio/video text/command file to the client by sending the file into a socket. Both TCP and UDP socket connections may be used. Before sending the audio/video file into the network, the file is segmented, and the segments are encapsulated with header information appropriate for audio/video text/command traffic, described in further detail below. Data formatting and generation may be accomplished at central service 200, or a similar service local to a venue. Alternatively, central service 200 may be located at a venue 110. Venue 110 may be equipped with a central service and/or local service, described below. Data server 140 is capable of receiving content from more than one server (central service 200, or one or more local services). In one embodiment, data server 140 stores all messages on a "carousel"-type buffer and constantly broadcast the contents of the buffer via transmitter 150. "Carousel"-type refers to a session protocol that repeatedly broadcasts a set of data packets over an amount of time in order to ensure that they are received by one or more receivers.

Operators at the central service may manually enter encapsulation data element by element or, alternatively, central service may be operable to automatically enter encapsulation data.

At venue 110, the data feed is received at data server 140 and communicated to transmitter 150 via, e.g., via a UDP protocol on an ethernet connection. Data server 140 may include a serving gateway and a Packet Data Network (PDN) gateway, and a control node that processes the signaling between central service 200 or local service(s) and mobile receivers 130. Transmitter 150 may be a permanently installed arena transmission antenna that sends out an RF signal over a selected distance, for example, a 3.5 square mile/6 km area (one mile/1.6 km radius). Transmitter 150, in one embodiment, transmits a one-way data broadcast between 217-220 MHz (200 kbps). With FCC permission, the selected distance may be larger. Several types of transmission mechanisms as are known in the art may be employed, including pulse-code modulation (PCM) over an FM radio signal. ISDB-T, ISDB-T, multimedia broadcasting, Digital System E, T-DMB, DVB-H, DVB-SH, FLO, RAVIS and DVB-T2 Lite.

Figure 3:
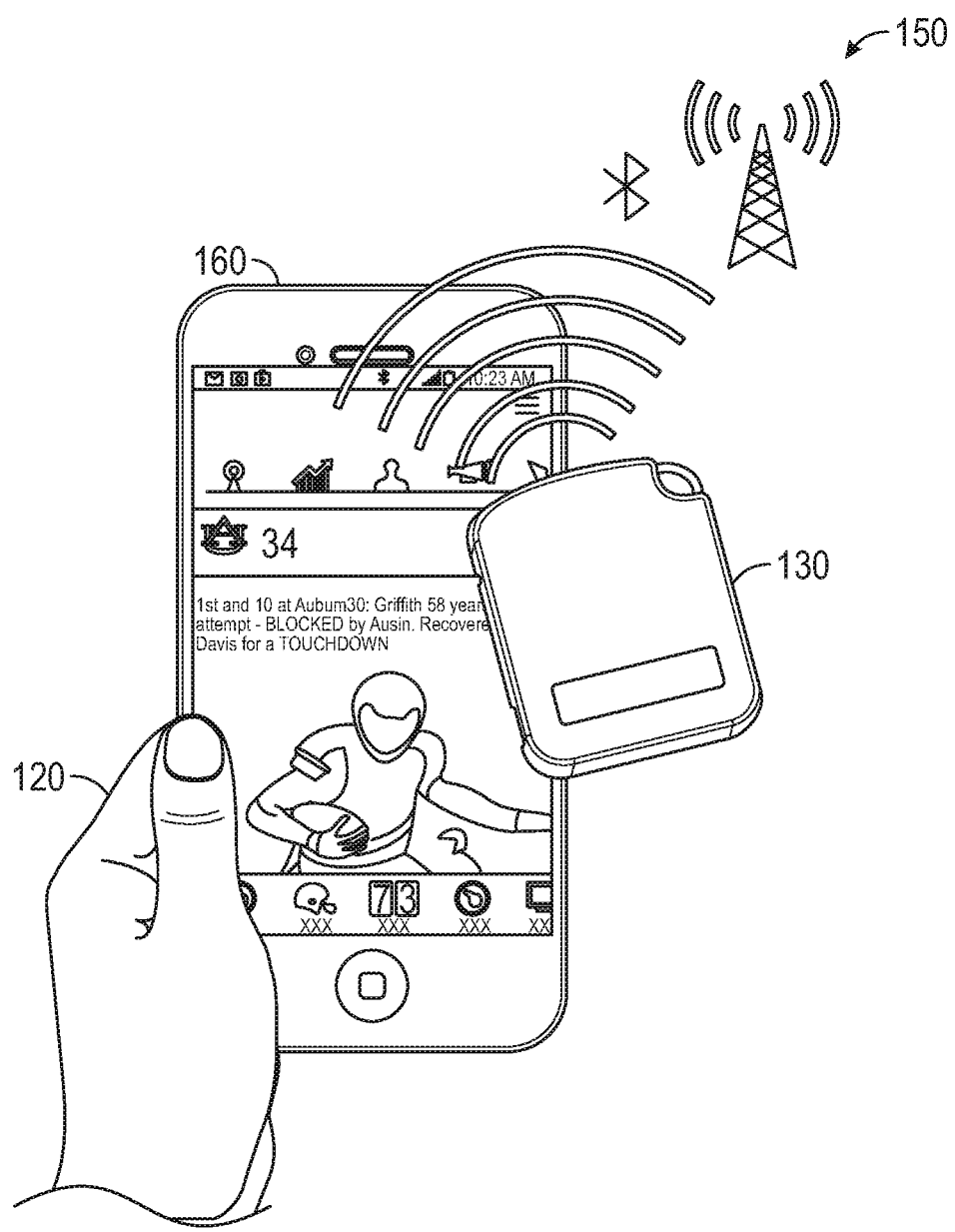
FIG. 3 is a diagram illustrating an example mobile receiver and a host device according to one embodiment of the invention.

Turning to FIG. 3, mobile receiver 130 and host device 160 are shown. Mobile receiver 130 may be a stand-alone receiver, designed to interface with and control a separate, non-digital device. In another form, mobile receiver 130 is operable to relay data to host device 160 via a wired or wireless communications protocol, e.g., Bluetooth. In yet another embodiment, mobile receiver 130 is integral to host device 160. In one embodiment, mobile receiver 130 is designed to be installed into vehicles, powered by the car's electrical system and powered up when the car is running. In another embodiment, mobile receiver 130 is portable and powered by batteries and turned on by a user. Mobile receiver 130 operations can use any RF frequency capable of sustain digital communications. In one embodiment, mobile receiver 130 operates on a frequency of 217 MHz.

Mobile receiver 130 receives broadcast data through its own receiver/antenna. Each mobile receiver 130 recovers information modulated onto an RF carrier and provides the information to a controller/processor either at the mobile receiver 130 or at host device 160. The controller/processor can be associated with a memory that stores program codes and data. The memory may be referred to as a computer-readable medium. In host device 160, the control/processor provides demultiplexing between transport and logical channels, packet reassembly, deciphering, header decompression, and control signal processing. The controller/processor may also responsible for error detection.

Mobile receiver 130 may have a port or connector (e.g., USB) for charging and data upload, and control switches, e.g., buttons, to activate and control various functions. A status/data transmission indicator, for example, a light, may also be provided. Mobile receiver 130 may be in the form of a small fob, via Bluetooth or other communications link including, but not limited to IR, short range EMF, near field transmission, etc., to a host device 160. Mobile receiver 130 may be operable to receive broadcast data from transmitter 150. Mobile receiver 130 may further include a transceiver to communicate with or otherwise transmit and receive data to and from host device 160, such as an acknowledgement signal or a control signal. In one embodiment, neither mobile receiver 130 nor host device 160 has broadband back/reverse channel capability back to central service 200, rather, host device 160 communicates with mobile receiver 130 via short range communications or narrow band back channel. Mobile receiver 130 may also communicate with a plurality of fixed transceivers located around venue 110 for that purpose. Mobile receiver 130 may further include a radio receiver or chip operable to receive standard FM radio broadcasts in the 88-108 MHZ frequency band. In one embodiment, mobile receiver 130 is a configuration of modules on host device 160 including an FM radio receiver.

Mobile receiver 130 may be assigned identifying information, such as a MAC address or other identifying code, such as EMEI or equivalent. Mobile receiver 130—assigned identifying information may be used so that a particular mobile receiver 130 can receive data broadcast transmissions intended to be both generally broadcast to all devices and specifically directed to identified mobile receiver(s) 130. Alternatively, the MAC address or other identifying information from host device 160 can be used to specify direct transmissions to an individual or group of recipients 120.

In one embodiment, mobile receiver 130 is configured as an intermediary receiver/transceiver that is operable to receive transmissions from central service 200, optionally decode them, and transmit them further to host device 160. The transmission from mobile receiver 130 to host device 160 may be accomplished by any communication link that is available in host device 160, or by a plug-in module if a por is available on the device, such as a Bluetooth adapter. Mobile receiver 130 is operable to communicate with host device 160 via application 170 running on host device 160, or via a terminal emulator program, such as Remote Desktop from Microsoft®. Application 170 allows compact message communications to control screens that may be previously stored in host device 160.

Figure 4:
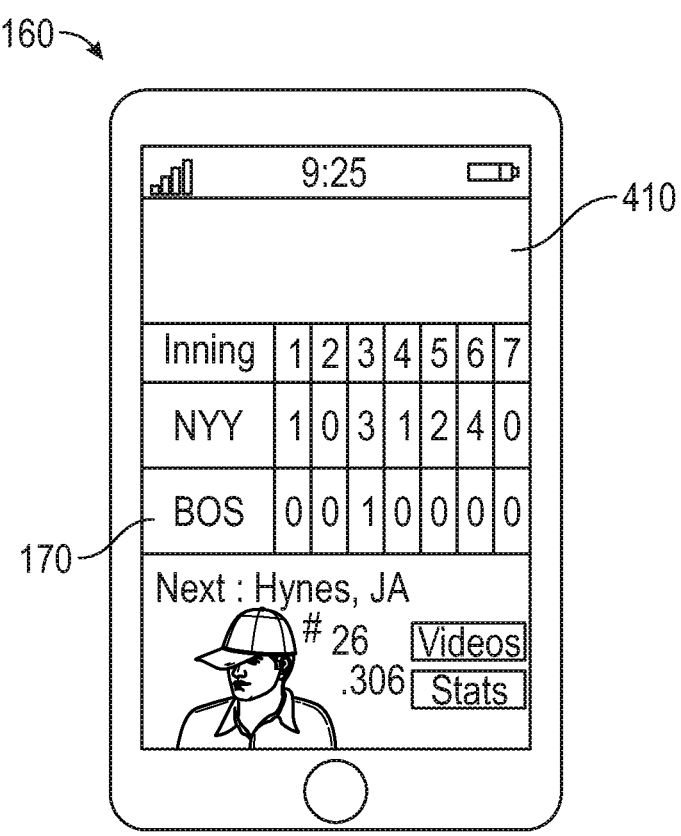
FIG. 4 is a diagram illustrating an example display on a host device according to one embodiment of the invention.

Turning to FIG. 4, host device 160 is shown with a display 410. Host device 160 may be a cellular mobile phone, a smart phone, a session initiation protocol (SIP) phone, a laptop, a personal digital assistant (PDA), a satellite radio, a global positioning system, a multimedia device, a vehicle radio or navigation system or computer, a video device, a digital audio player (e.g., MP3 player), a camera, a game console, or any other similar device. Host device 160 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable name. Host device 160 may be configured with an application 170 to receive or process the data broadcast at venue 110. In one embodiment, recipients 120 download application 170 to host device 160 from an appropriate application provider or app store. When recipients 120 open application 170, application 170 is configurable to sync or otherwise communicate with mobile receiver 130 (wired or wirelessly. e.g., via Bluetooth). Mobile receiver 130 transmits broadcast data to host device 160 that is processed by application 170. Separate or integrated helper application(s) like media players may be employed for playing audio/video data. Application 170 may further decompress the audio/video on the fly during play, suppress packet jitter, provide a graphical user interface for display to a recipient, etc.

In one embodiment, application 170 displays broadcast data on display 410, which may be viewable by recipients 120 the same way as a traditional website or mobile app. In one embodiment, application 420 may include a user profile associated with host device 160. The user profile may be include user preferences, including, for example, preferred language. If it anticipated that a particular broadcast will need to be able to send individual or group messages, then there will be address provisions defined whereby specific messages and instructions can be delivered over the air that will only be actionable by a receiver matching the address. Broadcast data may be displayed in the language specified in the user profile. In some embodiments, host device 160 may be a base station, a base transceiver station, a radio base station, a radio transceiver, a transceiver function, a basic service set (BSS), an extended service set (ESS), or some other suitable terminology. In one embodiment, host device 160 and mobile receiver 130 are configured within the same physical device.

In one exemplary embodiment, system 100 is deployed in football stadium to communicate digital data to game attendee recipients 120 each having a mobile receiver 130, in the form of a small (e.g., 1 inch by 1 inch) Bluetooth-enabled fob or pocket receiver. The football stadium is equipped with data server 140 and a transmitter 150, a 4 foot tall antenna for broadcasting data wirelessly to the mobile receivers 130. Each mobile receiver 130 receives broadcast data from transmitter 150, including, for example, game scores and statistics, video highlights and replays, messages, fan contests, advertisements, announcements, weather updates, custom programs, promotions, live video, etc., and retransmits the broadcast data to paired host device 160 via Bluetooth, including mobile phones, tablets, computers, or other wireless devices.

The host team or stadium owner, for example, may generate revenue by requiring a portion of sales made through mobile receivers during an event, or charging for sponsorships or advertisements broadcast during a game. The host devices 160 are operable to run an application 170 such as an app that is downloaded prior to or during the game from the Apple or Android App Stores, for example. When activated by a recipient, the application processes and displays broadcast data made available on host device 160 data received from the mobile receiver 130 fob.

The application running on host device 160 is configurable such that it displays information on display 410 based upon instructions provided in the broadcast. These instructions may reference tables containing specific information to display, for example, as shown in FIGS. 5A-D. The manner in which broadcast data is being used will depend on the programming of host device 160 paired to mobile receiver 130. In an effort to keep the data organized into small increments, a memory map may be organized in a series of "tables". In one configuration, there can be up to 255 different tables, with up to 255 rows and 255 columns per table. Each "cell" in the table will contain a single item that can be addressed individually by application 170 on the host device 160. Although it is not necessary, it may be preferable to organize the tables in such a way as to have the data stored in each table be similar in nature. Application 170 that runs on host device 160 will be written so that any part of the displayed information that will change will be controlled by a data set being stored in one of the tables, as shown.

In these examples, data types are indicated with "B" for octet and "S" for string. Symbols for certain features may be represented as well, for example, {GF}, which refers to a group filtered message or messages requiring evaluation of the Group ID, and {Sticky}, which means in this example that once set to "True," it should not be changed to false, even if instructions broadcast to host device 160 indicate otherwise. To avoid confusion with systems that use other than eight bits for a "byte," where this disclosure or the figures refer to a "byte," it should be understood to be referencing an "octet" or eight bits.

Figure 5A:
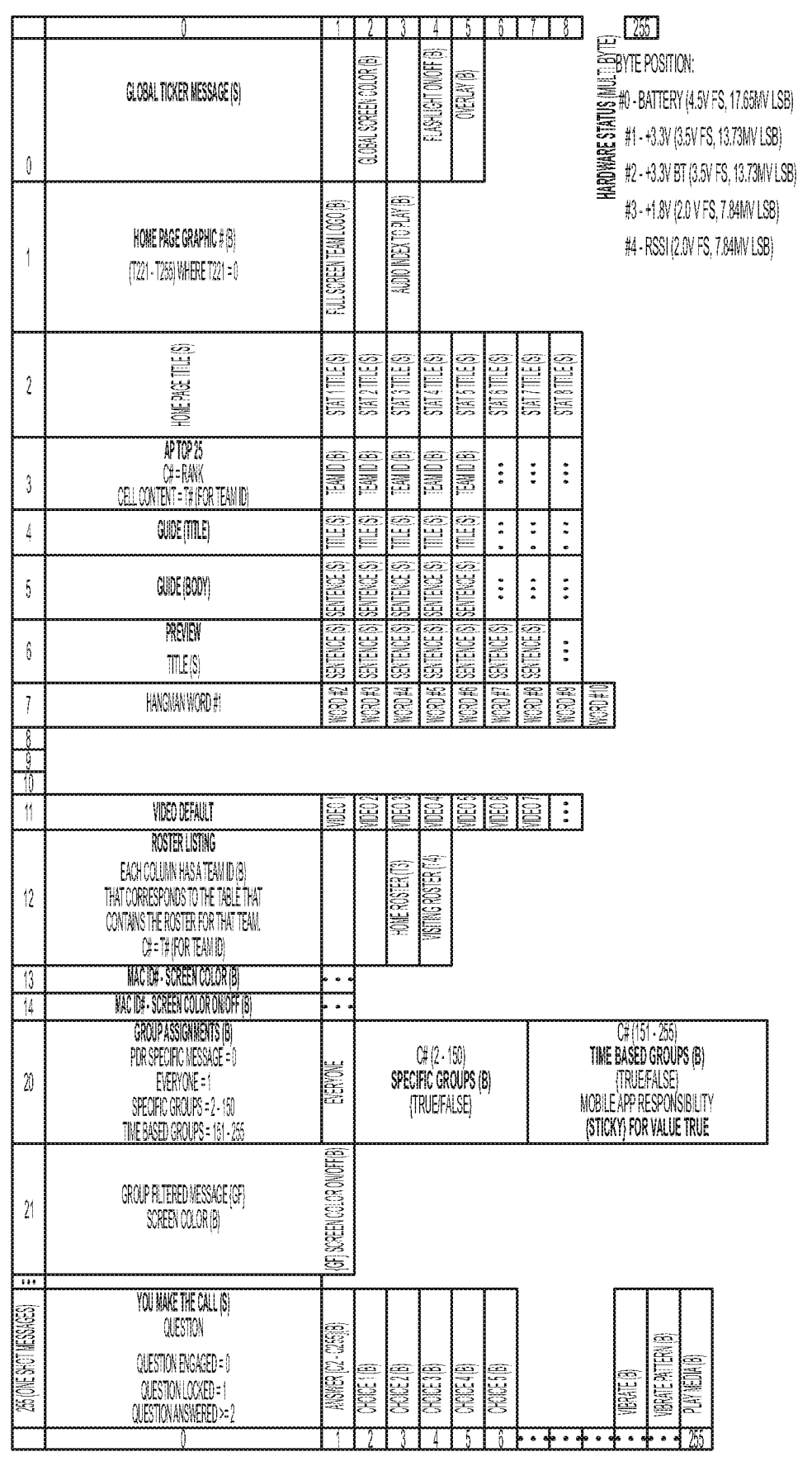
Figure 5B:
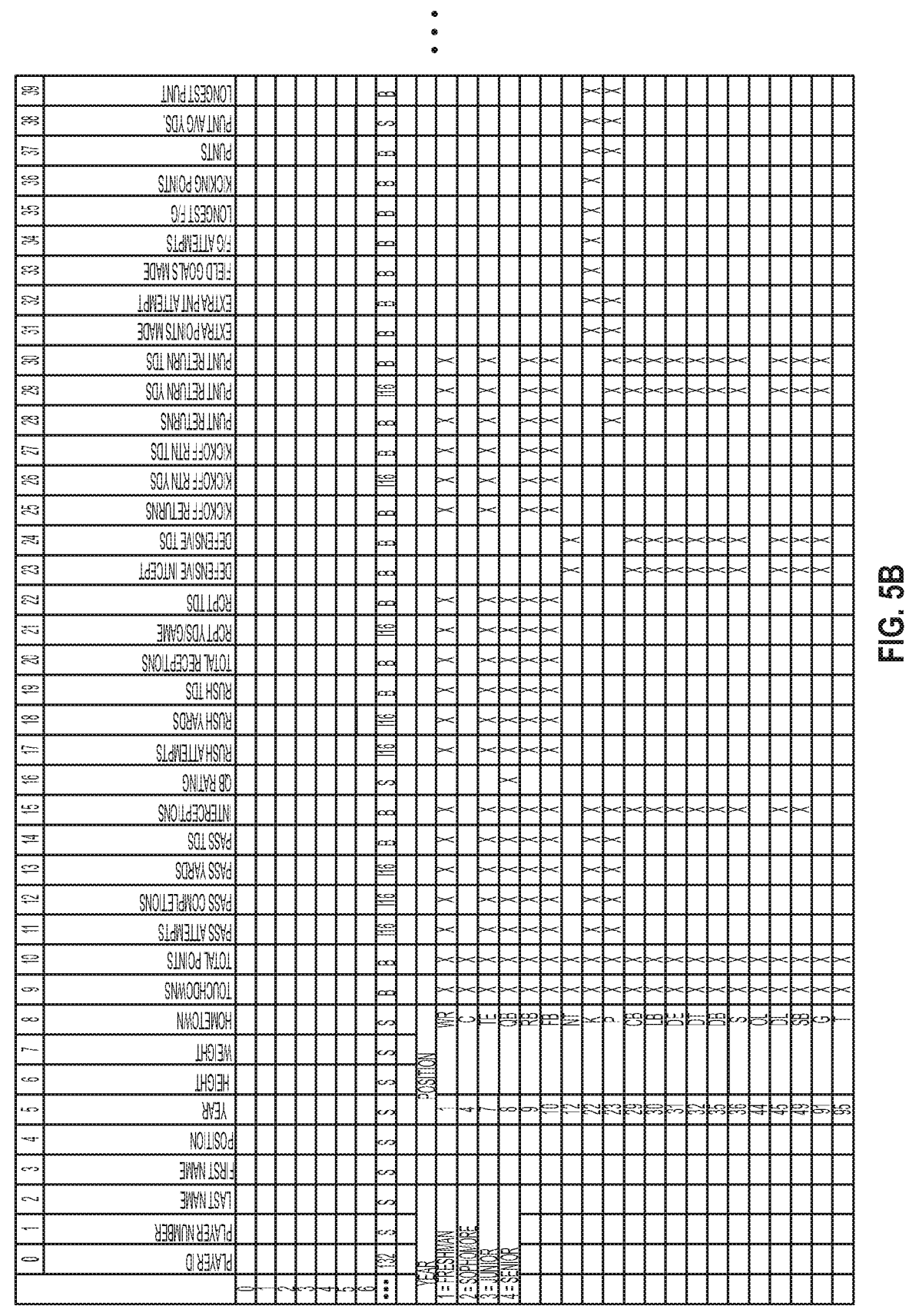
Figure 5C:
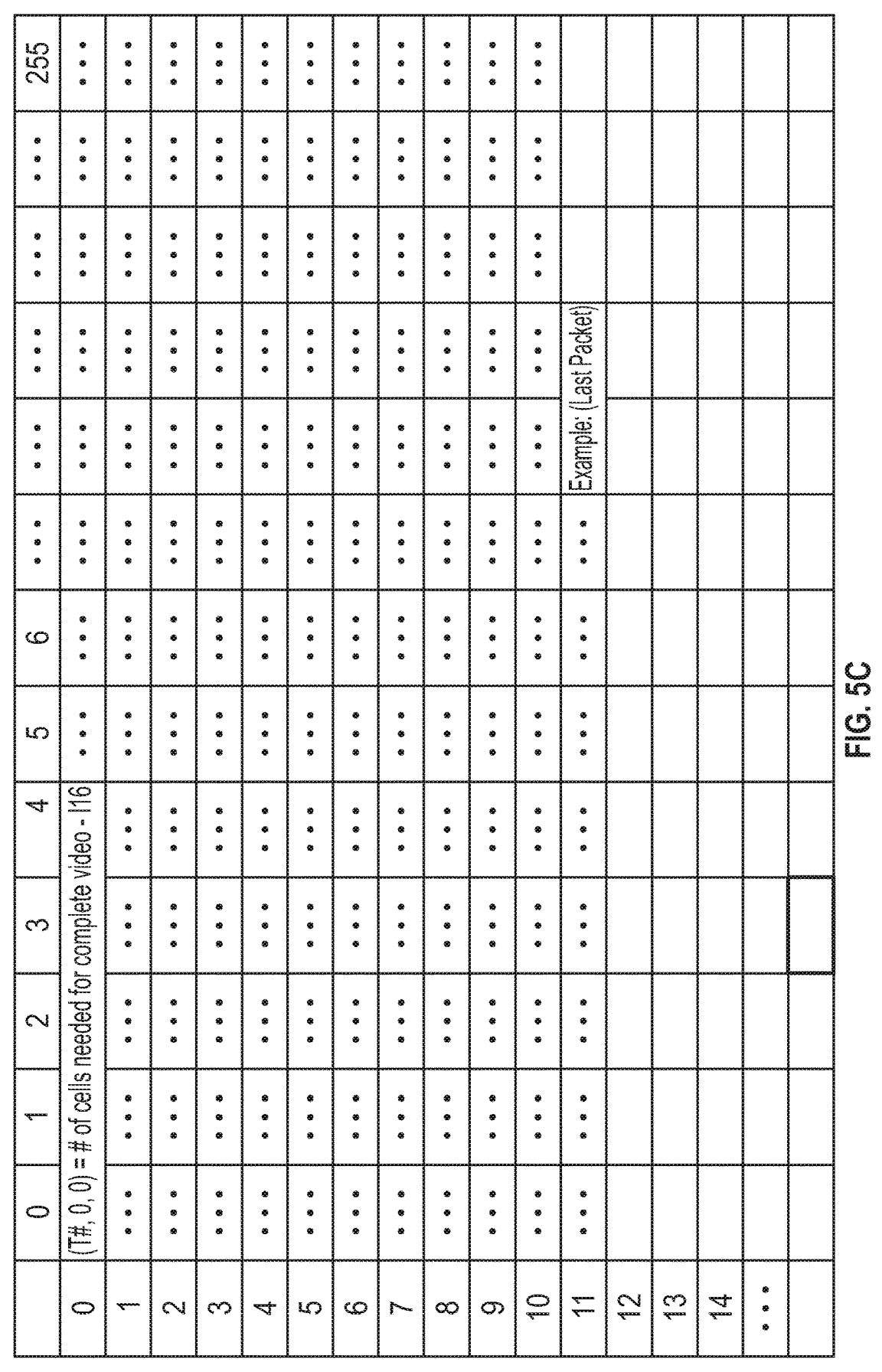

In one example shown in FIG. 5A, at row 12, column E, the broadcast indicates where the application should look to find the appropriate "home team" roster (in this case, table 3) and at row 12, column F, the "visiting team" roster (table 4) Each column has a "Team ID" (octet) that corresponds to the table that contains the roster for that team. An example table configuration that would contain the specific data for such rosters is shown in FIG. 5B. Turning back to FIG. 5A, a video display is referenced in row 11, column C. Exemplary reference table T200 is shown in FIG. 5C. In this example, the first cell in the table indicates how many additional cells are required to build the complete video. Photos or other multimedia files may be provided for in the same way. Other information can likewise be provided for in look-up tables, such as screen color, an exemplary lookup table is provided in FIG. 5D. Preferably, the amount of data per cell is kept small. Tables are re-created over and over with each transmission from the transmitter stream at a speed of, e.g., 200 kilobits per second. In one example, every cell of every table is re-written every 5 seconds. New information is therefore able to be displayed without re-rendering the entire display.

Figure 5E:
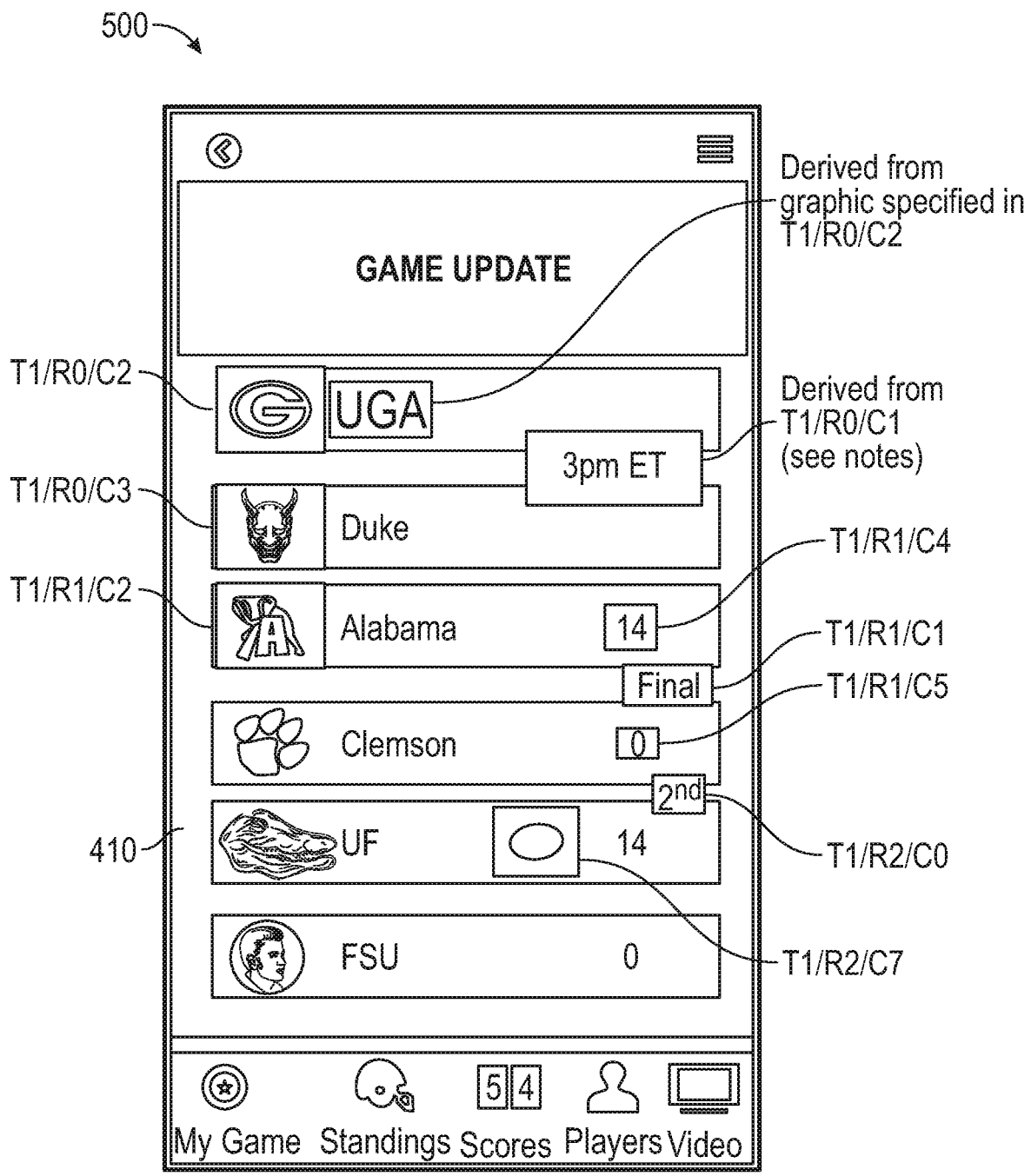
FIG. 5E is an annotated a diagram illustrating an example display on a host device according to one embodiment of the invention, where the references refer to location information within a reference table.

Turning to FIG. 5E, host device 160 and display 410 are shown with an exemplary "home page" for application 170. Overlayed are comments indicating application 170's references to the appropriate data to be displayed. For example, the graphic or logo for the first team displayed 510 is mapped to Table 1, row 0, column 2. Since the referenced element is a graphic (or photo, logo, etc.), the data at the referenced cell location in Table 1 will be assigned to a specific graphic file. In another example, the game time 520 ("3 pm ET") is found in the cell located at Table 1, row 0, column 1. As the information within the cells at each location is changed or removed over time, the display will update with the new information. In one embodiment, the data specified in the table, row, and column location will be displayed by application 170 as the data appears in the table cell (e.g., text or numbers). In another embodiment, the data included in the referenced table cell is equivalent to a command to display some other data. For example, the "game status" of the Alabama v. Clemson game is indicated by data located in Table 1, row 1, column 1, which contains the numeral 4. In this example, the contents of Table 1, row 1, column 1 reference specific text that should be displayed or additional actions, as shown in Table 1:

TABLE 1

| Table 1, Row 1 Column 1 | Reference |
|---|---|
| 1 | 1 = display game start time, including time zone |
| 2 | 2 = display contents of cell Table 1, row x, column 0 |
| 4 | 4 = display text "FINAL" |
| 5 | 5 = display text "POSTPONED" |
| 6 | 6, 7, 8, 9, 10, 11, 12 = display text "FORFEIT" |
| 23 | 23 = display text "DELAYED" |

Application 170, then, when the numeral 4 is included in the cell Table 1, row 1, column 1, displays the text "FINAL" as shown in 5E.

In one embodiment, recipients 120 can interact with data shown on display 410. For example, when a user "clicks" or taps or otherwise interacts on a section of the display 410 that is linked to that cell, assuming there is some level of connectivity to the internet, host device 160 will connect to the URL and relay a request along with the recipients' 120 contact information. For example, this may include a purchase request. In this manner, the broadcast content can enable a user to browse a catalog or menu without using the internet to download the content, and then relay a purchase request over the internet.

Turning to FIG. 6A, an exemplary message encapsulation protocol 500 that permits transmission of broadcast data without the need for bi-directional communication is shown. The message protocol allows for the transmission of digital instructions, files, streaming data, or any other type of digital information to plurality of devices, simultaneously.

In one embodiment, the digital information being broadcast is structured such that each octet of data is contained in a message that has a preamble including address information for intended mobile receiver(s) 130, as well as a location of the data within a larger file, if appropriate. This address information allows for data to be transmitted in any sequence necessary to accomplish the tasks of the overall network. Binary data can be intermixed with larger data files without corrupting the larger file. Address information can be in the form of, for example, a database address, table structure, or memory map. Each message being transmitted contains all address information necessary for the intended mobile receiver(s) 130 to interpret and execute or store the broadcast data.

When a data transmission is broadcast from central service 200, it will preferably have a multi-octet message data structure, with a preamble (or post-amble) that identifies, among other things, a venue ID, which identifies which stadium/venue the data transmission is intended to reach. Because there may be multiple events running simultaneously and in close proximity, mobile receiver(s) 130 may be, in certain embodiments, pre-set set to a particular event/ venue when activated. The structure may also include a message type, such as "general broadcast" to be received by every mobile receiver 130 for venue 110, or "specific" to a particular mobile receiver 130, which may be determined by matching mobile receiver 130's identifying information, such as a match of mobile receiver 130's MAC address. In one embodiment, an application operating on host device 160 is programmed to automatically communicate to central service 200 that it is operating and what venue it is receiving a broadcast from. Central service 200 then links this information to a database of recipients 120 that was. e.g., created when the application was initially installed on the user's host device. A mobile receiver 130's MAC address can be associated with a venue in the database and refer to that if/when central service 200 needs to pass along an individual/group message. The structure may further include, in the case of a specific-type message, further octets with the mobile receiver 130's identifying information (e.g., MAC address). The structure may also include a memory map or message-type identifier, which tells the mobile receiver 130 and/or host device 160 (if appropriate), how the broadcast data should be used, and/or where it should be stored in a pre-defined memory map. In one embodiment, this information is defined in the application when installed on host device 160. When address information is stored in the pre-defined cell location (described below) matches mobile receiver 130's MAC address, the content of the payload of that particular message may be acted upon as defined in the application. The structure will further include message data. In the case of a video or picture, the message may be a single or group of pixels.

In one embodiment, in order to account for the lack of backchannel bandwidth, accommodations have been made to insure message delivery without a back-channel acknowledgement signal. Central service 200 will preferably continuously transmit all messages for a predetermined period of time even if they have long been received by host devices. This will allow "backfill" of message data that might have been missed in the first transmission but due to lack of acknowledgement, there is now way to know which data is missing. By continually retransmitting for the predetermined period of time, most messages will ultimately be completely delivered without the need to acknowledge. In a spots application, for example, a score will constantly be retransmitted unless/until it has changed. At that point, the revised score will become a part of the carousel broadcast. Content being used by the application will be constantly be rebroadcast using this carousel methodology so that at any given point in time the most current information is available to the user.

In FIG. 6A, an exemplary container format or header information 610 for transmitting a data stream for use with the systems and methods described herein, or others, is provided. The messages can be of various lengths, from a few as 9 octets up to 60 octets.

The "0" octet 611 of each message contains a "Message ID". This number indicates the type of message that follows. The "01" octet 612 is the "Venue ID". As discussed above, this is a number that is set by the transmitter program and sent by the central service 400, and is unique to each event/venue, and/or event/venue/date.

Transmitter program, in one embodiment, is a software program running on central service 200 or any local service used at a particular event. Transmitter program (and local service transmitter programs) are responsible for creating all message packets to be broadcast at a particular event. These message packets are then communicated to data server 140 where they are added to the carousel buffer for continuous broadcast by transmitter 150 until changed or removed (e.g., by central service 200 or a local service). Software in the host device 160 saves the VenueID number in memory (e.g., NVRAM), such that it compares the "01" octet of each message with the VenueID number saved. If the number saved is the same as the number contained in octet "01" of a message, then it can be ignored, and the message should be processed normally. i.e., parsed and saved to memory. If the number contained in octet "01" of a message is different than what has been saved in memory, then all data stored in all the tables will be cleared, and the new number saved. New tables are then created and loaded with the data in subsequent received messages. In one embodiment, using this process, old data that may be stored in a recipient's host device's display is "cleared" when he or she goes to a new event, location, or venue. In another embodiment, an exception is provided when the VenueID=0. In this case, a memory reset is not initiated, and the received message is processed as an "Individual-Address" or message intended for a specific mobile receiver 130. The first six octets of an "Individual-Address" message may be used to indicate the identifying information of a mobile receiver 130, e.g., MAC address or other ID of the intended mobile receiver 130. All other mobile receivers 130 will then ignore this message.

Octet "02" 613 contains a number ($C_L$) that indicates whether or not the data that follows will be the entire contents of a cell in one of the tables, or whether it is one of a series of messages that will be used to populate the cell. For example, if $C_L$ is a "0", then the data that follows will be the entire contents of the cell. The contents of that message will overwrite the data being currently stored in the cell (if any). If $C_L$ is "1", then the contents of that message will be the first part of what will eventually be a series of characters in that cell. If $C_L$ is "2", then the contents will be appended to the end of what was sent in an earlier message, and so on. In one example, anytime $C_L$ is set at "0" or "1", then all data currently stored in cell is overwritten.

Octet "03" 614 contains a number that indicates how many total octets are in the message. This number is $8+P_L$, where $P_L$ indicates the number of octets in the actual payload of the message. $P_L=0$ indicates a 1 octet payload, $P_L=1$ indicates a 2 octet payload, etc. The Checksum is not counted in the message length calculation.

Octets "04" 615, "05" 616, and "06" 617 contain the address location for the information contained in octets "07" through "$P_L+7$". In one example, octet "04" 615 indicates the table number, octet "05" 616 indicates the row number, and octet "06" 617 indicates the column number of a location where the data is to be stored. Since $P_L$ indicates the number of octets being stored in the cell, information contained in octets "07" through "$P_L+7$" are stored sequentially in the cell specified by octets "04". "05", and "06".

The last octet ($P_L+8$) 618 is always the Checksum. This octet is used to validate each message received, but it is not stored in the table.

FIG. 6B provides an exemplary message. In this structure, MID=F4=Variable Length Message, VID=48, PID=17, LEN=9, AT=Table #=17. AR=Row #=1, AC=Column #=1, Data=D0+D1=01, 00, CHK=AD.

In one embodiment, each packet of a message to be broadcast is a standalone item. The address scheme described above allows for any packet that has been properly received by a mobile receiver 130 to be saved, assembled, and displayed by a paired host device 160 with any other required packets, independent of whether or not other content has yet to be fully transmitted. In other words, if the text portion of an alert message is split between five packets, then as soon as those five packets are received, the message can be displayed on host device 160, even though there may be more packets still being broadcast that belong to, for example, an associated multimedia file like a photo or video. By way of example, as shown in FIG. 5, row 0, column 0 is used to display announcements sent to all recipients 120 at a game. Message packets do not necessarily have to be received by mobile receiver 130 in sequential order, nor do they have to be contiguous.

In one embodiment, the system functions at any baud rate. Time delays between messages have no impact, nor do the packets necessarily need to be sent at the same rate throughout the broadcast transmission. In one example, the message format is transmitted at a baud rate of 4800 baud.

In one embodiment, the message format is provided for RF broadcasting of multimedia content. In an alternative embodiment, the message format is used to allow for the broadcasting of the same type of content over the entire Internet via UDP. Since individual packets within the data stream can be received in any order, and do not require acknowledgement of receipt, packets can be transmitted over a UDP connection. Allowing for the use of UDP can dramatically increase the speed and reduce the infrastructure requirements of a typical internet server used by someone who is attempting to serve content over the internet to millions of simultaneous recipients 120. Since UDP is a "connectionless" protocol, the data being transmitted over it can be simultaneously received and processed by millions of recipients 120 without having to increase bandwidth at the server, or router capacity based on user demand for the data. Also, since there are no requirements for data receipt acknowledgement, transfer rates will rise dramatically due to reduced network congestion.

In a further embodiment, multimedia messages or digital data may be transmitted to an FM transmitter to recipients 120 having mobile receivers 130 wherein the mobile receivers 130 (whether physically integrated or separate from host device 160) comprise an FM radio chip. Host devices 160 like cellular phones or automobile control panels/car radio or stereos or similar combination radio/navigational systems may contain FM radio chips. Digital data/multimedia information may be segmented and encapsulated using header information as provided above, modulated to be sent over FM, and then broadcast from FM transmitters to the mobile receivers 130 (like the FM tuner and demodulator chip and related modules in a car stereo system, for example) at, for example, 56 kb/s. In the case of car stereo mobile receivers 130, each packet can be alternated over the left/right stereo channel. Software application(s) on the host device 160 would receive (or optionally pull) data from the FM chip and decode and re-assemble the segments to render the message. The carrier frequency of such a system is likely country dependent and may be selected by one of ordinary skill.

In a further embodiment, transmitter 150 is constantly transmitting and re-transmitting the entire structure of the broadcast data being used by mobile receivers 130 at venue 110. As the broadcast data changes (lap times, weather, scores at a football game, for example), a new message is transmitted that overwrites previously broadcast data in cells such that display 410 on a host device 160 changes to reflect the updated broadcast data. If the broadcast data is being used to provide information to application 170 for display on display 410, then display 410 can be changed immediately, without having to re-transmit the entire dataset used to generate the display originally.

Host device 160 constantly regenerates or refreshes display 410, by monitoring the broadcast data from mobile receiver 130 to host device 160. If any broadcast data is changed by a sequence of messages from transmitter 150, then display 410 is updated as soon as those messages are received at mobile receiver 130, transmitted to host device 160, and processed and displayed by application 170. This may apply broadcast data formatting or display preference information (e.g., screen colors). Any portion of the information shown on display 410 can be changed to indicate an event has occurred (e.g., changing the screen to yellow when a race goes under a caution alert). Exemplary applications 420 may be configured such that any content that a publisher would like to be able to control or change can be found in tables defined at the beginning of the application programming process. These features can include text, pictures, screen layout, equipment of the host device (like the flashlight on a smartphone), or sounds that can be played back over host device 140's speakers. Content and instructions can be transmitted and stored in specific locations in the cells of the tables, and application written to look for the content/instructions in those defined cells.

Thus, even without an acknowledgement signal sent back to transmitter 150 from receiver(s) 130, display 410 on host device 160 should eventually fully populate with the complete intended broadcast data, even if broadcast data is initially missing or lost in transmission.

In one embodiment, broadcast data being transmitted can also include digital instructions that can be used to control devices located at venue 110, as illustrated in FIG. 1. This may be particularly useful for devices where not being hard-wired to a larger network is desirable. Because each message being transmitted contains address information specifying which mobile receiver 130 it is intended for, mobile receivers 130 can be built to emit control signals to turn other devices on or off, as well as configure and/or control these devices with digital commands being embedded in the broadcast data. For example, mobile receivers 130 may be operable as controllers for larger screen devices or track lighting (Jumbotron® devices, for example). At a racetrack, for example, it may be difficult to set up hardwire controllers at each electronic sign. Instead, system 100 could be used to control a large device from a mobile receiver 130 and no controller wiring will be required.

Figure 7:
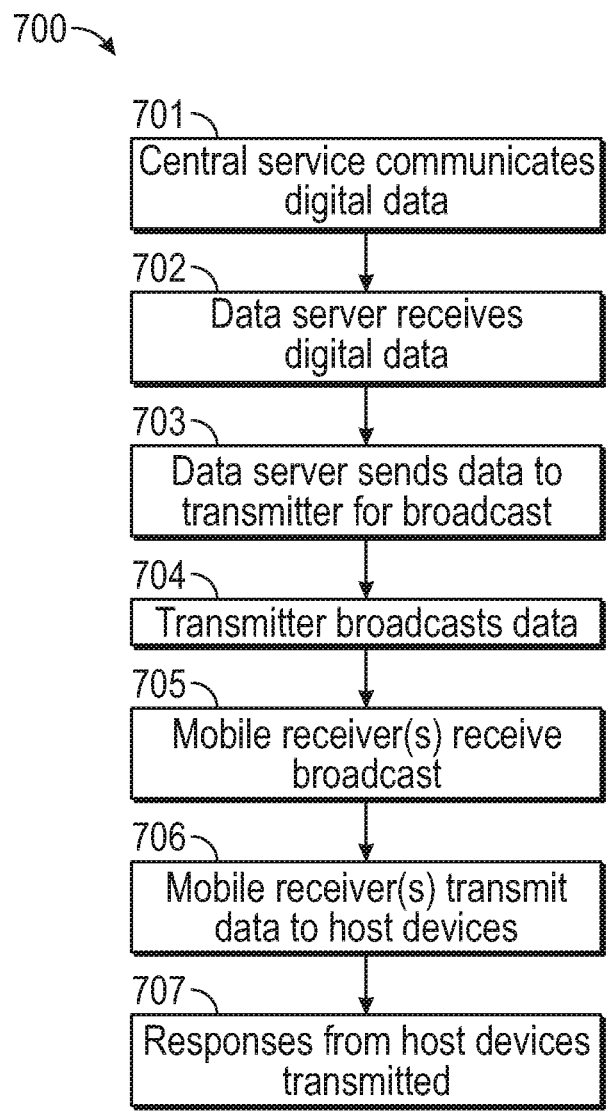
FIG. 7 is a flow diagram illustrating a method according to one embodiment of the invention.

In FIG. 7, a method of broadcasting data 700 to a plurality of mobile receivers is shown. In step 701, a central service 200 communicates data including content, e.g., spots scores, event updates, emergency information, multimedia. etc. to a system deployed in a venue 110, for example, via the Internet. The venue 110 is equipped with a data server 140 and a transmitter 150 for broadcasting data wirelessly. In step 702, data from central service 200 is received at data server 140, which is in communication with transmitter 150. In step 703, data server 140 communicates broadcast data to be broadcast to recipients 120 each having a mobile receiver 130 to transmitter 150. In step 704, transmitter 150 transmits broadcast data to mobile receiver(s) 130, which contain at least one transceiver, and are paired with host device(s) 160. In step 705, mobile receiver(s) 130 receive broadcast data and in step 706, transmits broadcast data to host device(s) 160, which are running applications to process and/or display the broadcast data. In step 707, responses from host device(s) 160 are transmitted back to system 100 (if any) via a network available to host device 160, such as a TCP/IP network. In one embodiment, this feature may be used where menu or catalog items are broadcast to recipients 120, and then if a user wants to purchase something from the menu or catalog items, the user selects an item (via application 170), and the purchase request, along with, e.g., payment information, can be relayed back to the store via a TC/PIP network (e.g., cellular or Wi-Fi).

In one embodiment, data server 140 is operable to selectively transmit data received from central service 200. Data authorized for all recipient(s) in a location may be transmitted to transmitter 150 for general broadcast to all mobile receivers 130. Data authorized for only select recipients may be accessible by host device(s) 160 only if the recipient(s) possess or enter, for example, a required code, or, in another embodiment, only to mobile receiver(s) 130 having certain identifying information. In one embodiment, this service may be implemented by either central service 200, or a local service.

In another embodiment, transmitter 150 is constantly broadcasting the entire structure of the data to be communicated to mobile receiver(s) 130 using the carousel methodology. Thus, even without an acknowledgement signal sent from mobile receiver(s) 130, displays on the host device(s) 160 eventually fully populate even if data is initially missing/lost.

Figure 8:
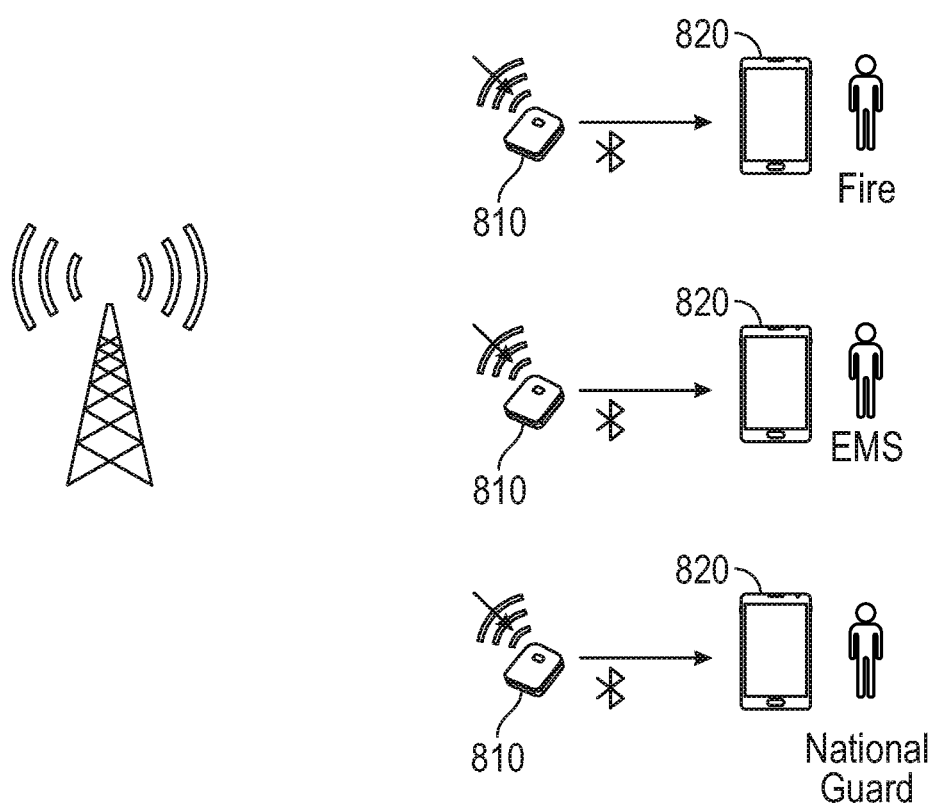
FIG. 8 is a diagram illustrating a portion of a system architecture for transmitting emergency alerts according to one embodiment of the invention.

Turning to FIG. 8, an embodiment of the methods and systems of the invention suitable for application in emergency or disaster situations 900 is provided. Until there is widespread deployment of LTE or other broadcast technology in the U.S., WEA multicast messages containing multimedia content are not available generally in emergency situations. WEA is a public safety system that allows customers who own certain wireless phones and other compatible mobile devices to receive geographically-targeted, text-like messages alerting them of imminent threats to safety in their area. Cell phones are not currently equipped to receive multimedia broadcast messages. One embodiment of the invention provides a system wherein recipient(s) wishing to receive WEA multicast messages are provided with mobile receivers 810, for example, a small, Bluetooth®-equipped digital receiver used to receive a message transmitted in packets, and then re-transmit the message to a host device 820 (e.g., a mobile phone) using Bluetooth® protocols. On the host device 820, the message is received and processed by a software application which contains the codec and APIs necessary to compile the message packets back into text, binary commands, or multimedia content, as appropriate.

By way of example, in a hurricane, government authorities (e.g., FEMA) could distribute mobile receivers 810 to emergency personnel or residents of an affected area so that recipients can receive up-to-date information, weather and news alerts, or emergency alerts from government officials, with multimedia information such as maps, videos, photos, etc. Multimedia messages can be broadcast to mobile receivers 810 from a mobile or temporary transmitter deployed in a relevant geography, area, or venue (e.g., shelter). Recipients can download an application ahead of the disaster to their mobile phones or other host devices that can be paired with mobile receivers 810 via any available communications channel, e.g., Bluetooth.

FIGS. 9A and 9B provide exemplary information for governmental alert messages transmitted through the systems and methods of the invention. FIG. 9A is an example of an Emergency Alert message as specified in the Common Alert Protocol, Ver. 1.2 standard using extensible markup language (XML), which is the universally adopted method for distributing emergency alert messages nationally and internationally. FIG. 9B shows an example of how the information in this XML message could be converted to a table format, compliant with the broadcast format described herein.

In this embodiment, transmitter 150 is constantly sending out the entire structure of the data shown, which is stored in tables. As things change (e.g., "urgency" level or "certainty" level, or image file or GIF), a broadcast data message will overwrite the data in the cell where that data was stored. Host device 160 display 410 will change to reflect the updated information.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Figure 10:
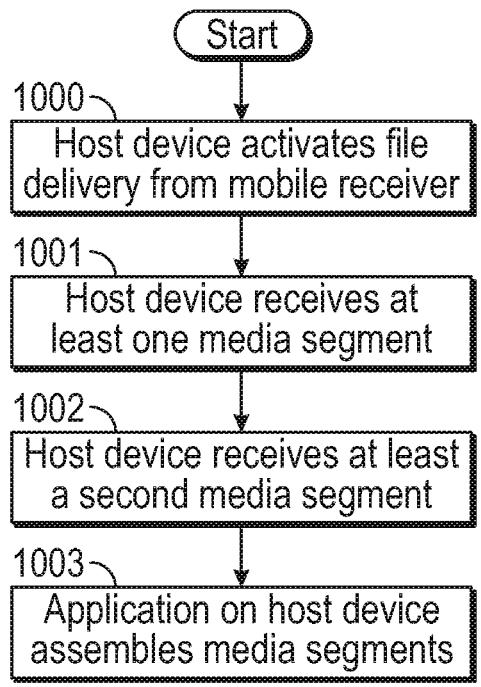
FIG. 10 is a flow diagram illustrating a method according to one embodiment of the invention.

Turning to FIG. 10 a flow diagram is provided. At step 1000, host device 160 running application 170 activates a file delivery session for a broadcast service at a venue 101. Host device 160 begins to download content on a defined network address and port associated with a transport session ID of the file delivery session. At step 1001, the host device 160 receives at least one first media segment associated with a digital file broadcast at venue 101. At step 1002, the host device 160 receives at least one second media segment associated with the digital file broadcast at venue 101. In one embodiment, this method is used to transfer digital files (e.g., pictures, audio, and video. At a particular venue, a table is defined to store the digital information required to create the desired digital file, as a series of cells contained in a table. The digital file is divided up into segments (for example, between 20-60 octets each), and then each segment is stored in a different cell within the table. Application 170 running on host device 160 evaluates the contents of received media segments, and combines them in the proper order according to so that the original digital file is accessible or viewable by a user.

Figure 11:
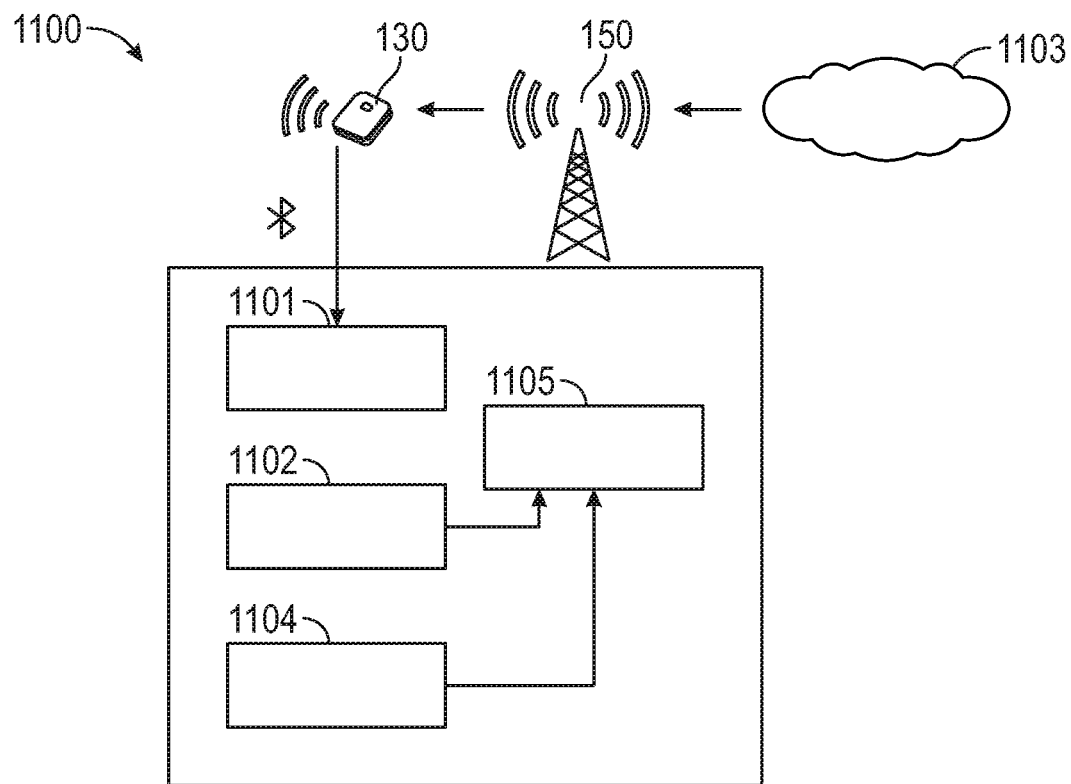
FIG. 11 is a block diagram illustrating an example hardware implementation according to one embodiment of the invention.

FIG. 11 illustrates a conceptual data flow diagram illustrating the data flow between different components in an exemplary apparatus 1100. The apparatus may be a host device 160. The apparatus 1100 includes a broadcast data management module 1101 that is operable to activate a session in a broadcast network at a venue. The apparatus 1100 further includes a broadcast data processing module 1102 that is operable to receive a data stream in the session from a network 1103. The data stream includes at least one encapsulated digital data file segment, wherein the at least one encapsulated digital data file segment is associated with address information. The apparatus 1100 further includes a data caching module 1104 that is operable to cache the at least one encapsulated digital data file segment. The apparatus 1100 further includes a content processing module 1105 that is used to decode multimedia encapsulated digital data file segments for playback while also using the cached encapsulated digital data file segments. The broadcast data processing module 1102 may be further operable to receive additional encapsulated digital data file segments associated with the digital data file. As such, each step in the aforementioned flow chart may be performed by a module and the apparatus 1100 may include one or more of those modules.

Figure 12:
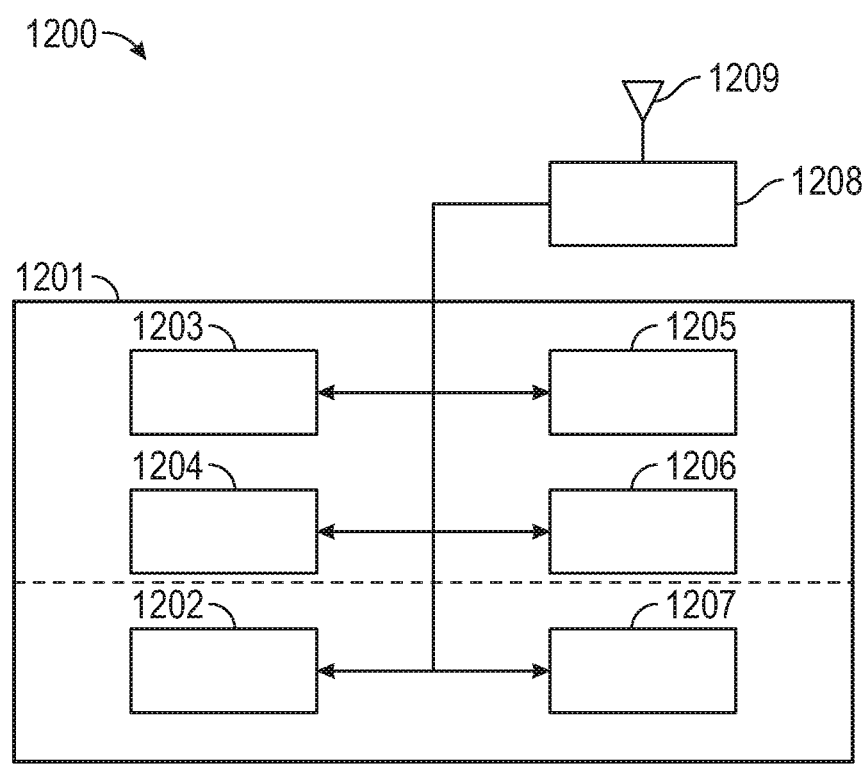
FIG. 12 is a block diagram illustrating the functionality of an example implementation according to one embodiment of the invention.

FIG. 12 is a diagram illustrating an example of an implementation for an apparatus 1200 employing a processing system 1201. The processing system 11201 may be implemented with a bus architecture. The processing system 1201 may include any number of interconnecting buses and bridges depending on the specific application of the processing system 1201 and the overall design constraints. The processing system 1201 links together various circuits including one or more processors and/or hardware modules, represented by the processor 1202, the processing modules 1203, 1204, 1205, and 1206, and the computer-readable medium 1207. The processing system 1201 may also link various other circuits such as timing sources, peripherals, voltage regulators, and power management circuits known in the art. The processing system 1201 may be coupled to a transceiver 1208. The transceiver 1208 is coupled to one or more antennas 1209. The transceiver 1208 provides a means for communicating with various other apparatus over a transmission medium. The processing system 1201 includes a processor 1202 coupled to a computer-readable medium 1207. The processor 1202 is responsible for general processing, including the execution of software stored on the computer-readable medium 1207. Software, when executed by the processor 1202, causes the processing system 1201 to perform the various functions described above for any particular apparatus. The computer-readable medium 1207 may also be used for storing data that is manipulated by the processor 1202 when executing software. The modules 1203, 1204, 1205, and 1206 may be software modules running in the processor 1202, resident/stored in the computer-readable medium 1207, one or more hardware modules coupled to the processor 1202, or some combination thereof. The processing system 1201 may be a component of the host device 160 and/or mobile receiver 130 and may include other memories and processors.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Therefore, it is intended that the invention not be limited to the particular embodiments disclosed as the best mode contemplated for carrying out this invention, but that the invention will include all embodiments falling within the scope and spirit of the appended claims.

I claim:

1. A system for communicating multimedia data to a plurality of receivers, wherein each of the plurality of receivers comprises a unique identifier, a display, and is operable to receive digital data segments, reformat the digital data segments into the multimedia data, and display the multimedia data, the system comprising:
 a central service operable to segment the multimedia data into two or more digital data segments, encapsulate the two or more digital data segments with header information, and transmit the two or more digital data segments to the plurality of receivers, wherein the header information comprises:
 at least one byte identifying whether the multimedia data is intended for all of the plurality of receivers, a data type indicator,
 a series indicator that indicates whether or not the digital data segment is one of a series,
 a total byte number indicator that indicates the total number of bytes in each of the two or more digital data segments,
 address location information that indicates a location where each of the two or more digital data segments is to be stored, and
 a checksum;
 wherein the central service is operable to repeatedly transmit the two or more digital data segments to the plurality of receivers using a connectionless communication protocol over a virtual private network (VPN).

2. The system of claim 1, wherein the connectionless communication protocol is UDP.

3. A method of communicating multimedia data to a plurality of receivers, comprising the steps of:
 at a central service, segmenting multimedia data into at least two digital data segments, and encapsulating each of the at least two digital data segments with header information, the header information comprising at least one byte identifying whether the multimedia data is intended for all of the plurality of receivers at a given location, at least one byte identifying a data location in a cell of a data table or memory map, and at least one byte with data for said cell;
 repeatedly transmitting the at least two digital data segments to a plurality of remote receivers over a predetermined period of time using a connectionless communication protocol;
 whereby the at least two digital data segments can be received, cached, assembled into displayable multimedia data by at least one of the plurality of receivers, and the displayable multimedia data can be displayed on the at least one of the plurality of receivers.

4. The method of claim 3, wherein the connectionless communication protocol is UDP.

5. A system for communicating multimedia data to a plurality of mobile receivers, comprising:
 a. a central service operable to segment the multimedia data into two or more digital data segments, encapsulate the two or more digital data segments with header information, and communicate the two or more digital data segments to a remote data server for broadcast to the plurality of remote mobile receivers, wherein the header information comprises:
  i. a venue identifier,
  ii. at least one data structure identifying whether the multimedia data is intended for all of the plurality of mobile receivers at the venue,
  iii. a data type indicator,
  iv. a series indicator that indicates whether or not the digital data segment is one of a series,
  v. a total data structure number indicator that indicates the total number of data structures in each of the two or more digital data segments,
  vi. address location information that indicates a location where each of the two or more digital data segments is to be stored, and
  vii. a checksum;
  b. wherein the remote data server is operable to receive the two or more digital data segments, store the two or more digital data segments on a carousel buffer, and repeatedly transmit the two or more digital data segments to a transmitter for broadcast to the plurality of remote mobile receivers;
  c. wherein the transmitter is operable to broadcast the two or more digital data segments received from the remote data server to the plurality of mobile receivers;
  d. wherein the plurality of mobile receivers each
    i. comprises an antenna and a unique identifier,
    ii. is paired to at least one host device, and
    iii. is operable to receive the two or more digital data segments from the transmitter and re-transmit the two or more digital data segments to the at least one paired host device; and
  e. wherein each host device comprises a display and is operable to receive the two or more digital data segments, reformat the two or more digital data segments into the multimedia data, and display the multimedia data.

6. A method of communicating multimedia data to a plurality of mobile receivers, comprising the steps of:
  a. at a central service, segmenting multimedia data into at least two digital data segments;
  b. encapsulating each of the at least two digital data segments with header information, the header information comprising at least one byte identifying whether the multimedia data is intended for all of the plurality of mobile receivers at a given location, at least one byte identifying a data location in a cell of a data table or memory map, and at least one byte with data for said cell;
  c. repeatedly transmitting the at least two digital data segments to a remote data server for broadcast to a plurality of remote mobile receivers over a predetermined period of time;
  d. receiving the at least two digital data segments at the remote data server;
  e. storing the at least two digital data segments at the remote data server;
  f. communicating the at least two digital data segments via a carousel buffer to a transmitter for broadcast to the plurality of remote mobile receivers;
  g. broadcasting the at least two digital data segments to the plurality of mobile receivers;
  h. transmitting, by at least one of the plurality of mobile receivers, the at least two digital data segments to a host device paired to the at least one of the plurality of mobile receivers; whereby the at least two digital data segments can be received, cached, assembled into displayable multimedia data by at least one of the plurality of receivers, and the displayable multimedia data can be displayed on the at least one of the plurality of receivers.

7. A system for wirelessly broadcasting multimedia data to a plurality of mobile receivers, comprising:
  a central service running a transmitter program operable to segment multimedia data into digital data segments, encapsulate each digital data segment with header information, and communicate each digital data segment with header information to a remote data server for broadcast to a plurality of remote mobile receivers;
  wherein the header information comprises a venue identifier, a digital data segment type indicator, a mobile receiver identifier, a series indicator that indicates whether or not each digital data segment is one of a series, a total data structure number indicator that indicates the total number of data structures in each digital data segment, address location information that indicates a location where the digital data segment is to be stored, and a checksum; and
  a data server operable to receive the digital data segments and add them to a carousel buffer for continual broadcast by a transmitter until the digital data segments are changed or removed by the central service.

8. A system for communicating digital commands to a device paired to a remote control node, comprising:
  a central service running a program operable to segment digital commands into digital data segments, encapsulate each digital data segment with header information, and communicate each digital data segment with header information to at least one remote control node;
  wherein the header information comprises a venue identifier, a digital data segment type indicator, a remote control node identifier, a series indicator that indicates whether or not each digital data segment is one of a series, a total data structure number indicator that indicates the total number of data structures in each digital data segment, address location information that indicates a location where the digital data segment is to be stored, and a checksum; and
  a data server operable to receive the digital data segments and add them to a carousel buffer for continual broadcast by a transmitter until the digital data segments are changed or removed by the central service.

9. A method of executing a command at a device paired to a remote control node, comprising the steps of:
  a. at a central service, segmenting the command into at least two digital data segments;
  b. encapsulating each of the at least two digital data segments with header information, the header information comprising at least one byte identifying a data location in a cell of a data table or memory map, and at least one byte with data for said cell;
  c. communicating the at least two digital data segments via a carousel buffer to a transmitter for broadcast to the remote control node;
  d. broadcasting by the transmitter the at least two digital data segments to the remote control node;
  e. receiving the at least two digital data segments at the remote control node;
  f. caching the at least two digital data segments;
  g. assembling the at least two digital data segments into a command;

h. executing the command at the device paired to the remote control node.

10. A system for executing a command at a device paired to a remote control node, comprising:
   a central service operable to segment the command into two or more digital data segments, encapsulate the two or more digital data segments with header information, and transmit the two or more digital data segments to a remote control node, wherein the header information comprises:
   at least one byte identifying whether the command is intended for a plurality of remote control nodes,
   a data type indicator,
   a series indicator that indicates whether or not the digital data segment is one of a series,
   a total byte number indicator that indicates the total number of bytes in each of the two or more digital data segments,
   address location information that indicates a location where each of the two or more digital data segments is to be stored, and
   a checksum;
   wherein the central service is operable to repeatedly transmit the two or more digital data segments to the remote control node using a connectionless communication protocol over a virtual private network (VPN);
   wherein the remote control node comprises a unique identifier and is operable to receive the two or more digital data segments, reformat the two or more digital data segments into the command, and issue the command to the paired device.

11. The system of claim 10, wherein the command is a control signal.

* * * * *